United States Patent [19]
Kimura

[11] Patent Number: 5,168,157
[45] Date of Patent: Dec. 1, 1992

[54] SCANNING MICROSCOPE WITH MEANS FOR DETECTING A FIRST AND SECOND POLARIZED LIGHT BEAMS ALONG FIRST AND SECOND OPTICAL RECEIVING PATHS

[75] Inventor: Toshihito Kimura, Kanagawa, Japan

[73] Assignee: Fuji Photo Film Co., Ltd., Kanagawa, Japan

[21] Appl. No.: 794,887

[22] Filed: Nov. 20, 1991

[30] Foreign Application Priority Data

Nov. 20, 1990 [JP] Japan .................. 2-314746
Jan. 8, 1991 [JP] Japan ...................... 3-713

[51] Int. Cl.⁵ ............................... H01J 3/14
[52] U.S. Cl. ................... 250/234; 250/225; 359/371
[58] Field of Search ............ 250/225, 234, 216; 359/368, 371, 373, 391

[56] References Cited

U.S. PATENT DOCUMENTS

| | | | |
|---|---|---|---|
| 4,734,578 | 3/1988 | Horikawa | 250/234 |
| 4,927,254 | 5/1990 | Kino et al. | 359/235 |
| 5,081,349 | 1/1992 | Iwaski | 250/234 |

FOREIGN PATENT DOCUMENTS 62-217218 9/1987 Japan .

*Primary Examiner*—David C. Nelms
*Assistant Examiner*—T. Davenport
*Attorney, Agent, or Firm*—Sughrue, Mion, Zinn, Macpeak & Seas

[57] ABSTRACT

A scanning microscope comprises a sample supporting member for supporting a sample, and a light source for producing a light beam including a light component, which has been polarized linearly in a first direction, and a light component, which has been polarized linearly in a second direction that intersects perpendicularly to the first direction. A first polarizer transmits only the light component, which has been polarized linearly in the first direction. A second polarizer transmits only the light component, which has been polarized linearly in the second direction. A light projecting device forms a small spot of the light beam composed of the light components, which have respectively passed through the first and second polarizers. The sample is scanned with the light spot. A beam trap having a light blocking part, which has a shape corresponding to the shape of the first polarizer, blocks only the direct light component, which has been polarized linearly in the first direction and has passed through the sample. A polarization beam splitter separates the two light components from each otehr which are included in part of the light beam having passed through the sample and then through the beam trap. First and second light receiving devices respectively forms point images of the two separated light components.

30 Claims, 11 Drawing Sheets

SCANNING MICROSCOPE WITH MEANS FOR DETECTING A FIRST AND SECOND POLARIZED LIGHT BEAMS ALONG FIRST AND SECOND OPTICAL RECEIVING PATHS

BACKGROUND OF THE INVENTION

1. Field of the Invention

This invention relates to an optical type scanning microscope. This invention particularly relates to a scanning microscope, which can form an ordinary bright field image and a dark field image. This invention also relates to a confocal scanning microscope with which dark field photometry can be carried out.

2. Description of the Prior Art

Optical type scanning microscopes have heretofore been used. With the scanning microscope, a light beam is converged to a small light spot on a sample, and the sample is two-dimensionally scanned with the light spot. The light beam, which has passed through the sample during the scanning, the light beam, which has been reflected from the sample during the scanning, or the fluorescence, which is produced by the sample during the scanning, is detected by a photodetector. An enlarged image of the sample is thereby obtained. An example of the scanning microscope is disclosed in Japanese Unexamined Patent Publication No. 62(1987)-217218.

As one type of the scanning microscopes, a confocal scanning microscope has heretofore been proposed. With the confocal scanning microscope, a light beam is produced by a light source and is condensed to a light spot such that an image of the light spot is formed on a sample. Also, a point image of the light beam, which has been radiated out of the sample, is formed and detected by a photodetector. The confocal scanning microscope is advantageous in that no pinhole plate need be located on the surface of the sample. An example of the confocal scanning microscope is disclosed in Japanese Unexamined Patent Publication No. 62(1987)-217218.

Such that a very small object image beyond the resolution can be discerned, it has also been proposed to employ a dark field photometric technique in optical type scanning microscopes. Basically, the dark field photometric type of scanning microscope comprises:

(i) a light source which produces a light beam,
(ii) a sample supporting member on which a sample is supported,
(iii) a light projecting optical means with which an image of the light beam is formed as a small light spot on the sample,
(iv) a light receiving optical means, which is provided with a beam trap for trapping the direct light beam having passed through the object and with which the light beam scattered by the sample is condensed, an image of the condensed light beam being thereby formed as a point image,
(v) a photodetector which detects the point image, and
(vi) a scanning mechanism for two-dimensionally scanning the sample with the light spot.

It is rarely that users of scanning microscopes desire to obtain only dark field images. In general, in cases where it is desired for dark field images to be formed, it is also desired that ordinary bright field images can also be formed.

Therefore, in cases where it is desired for the dark field photometric technique to be carried out in an optical type scanning microscope, the optical type scanning microscope have heretofore been provided with both an optical means for the ordinary bright field photometric technique and an optical means for the dark field photometric technique, in which a beam trap is included. The two optical means are used selectively such that a bright field image or a dark field image may be formed.

However, considerable time and labor are required to change over the optical means used in the optical type scanning microscope. Such change-over operations have been a heavy burden to the operators who uses the microscopes.

Also, it is desirable that the state of a sample at any given instant can be investigated by viewing both the bright field image and the dark field image of the sample. However, in cases where the optical means for the ordinary bright field photometric technique and the optical means for the dark field photometric technique is used selectively, even if the operation for changing over the optical means is carried out as quickly as possible, it is impossible for both the bright field image and the dark field image of the sample at exactly the same instant to be obtained.

Additionally, it has been proposed to support a light projecting optical means and a light receiving optical means on a single movable member, and to scan a sample, which is placed on a sample supporting member, with a light spot of a light beam by moving the movable member with respect to the sample supporting member. Such a technique is proposed in, for example, U.S. patent application Ser. No. 587,122. In such cases, if a beam trap is employed in the optical means, the movable member becomes heavy, and therefore the scanning with the light spot of the light beam cannot be carried out quickly.

SUMMARY OF THE INVENTION

The primary object of the present invention is to provide an optical type scanning microscope in which time- and labor-consuming operations for changing over an optical means for a bright field photometric technique and an optical means for a dark field photometric technique to each other need not be carried out but with which both the bright field photometric technique and the dark field photometric technique can be carried out.

Another object of the present invention is to provide an optical type scanning microscope with which both a bright field image and a dark field image of a sample at strictly the same instant can be obtained.

A further object of the present invention is to provide a confocal scanning microscope in which no beam trap need be provided but with which a dark field photometric technique can be carried out.

The present invention provides a first scanning microscope comprising:

(i) a sample supporting member on which a sample is supported,
(ii) a light source for producing a light beam including a light component, which has been polarized linearly in a first direction, and a light component, which has been polarized linearly in a second direction that intersects perpendicularly to said first direction,
(iii) a first polarizer which has a predetermined shape, said first polarizer transmitting only said light component, which has been polarized linearly in said first direction, therethrough, (iv) a second polarizer for transmitting only said light component, which has been polarized linearly in said second direction, therethrough, (v) a light projecti image of the light beam composed of said light components, which have respectively passed through said first polarizer and said second polarizer, said image being formed as a small light spot on said sample, (vi) a scanning means which causes said light spot to scan said sample two-dimensionally, (vii) a beam trap having a light blocking part which has a shape corresponding to the shape of said first polarizer, said beam trap blocking only the direct light component, which has been polarized linearly in said first direction, said direct light component having passed through said sample, (viii) a polarization beam splitter for separating said light component, which has been polarized linearly in said first direction, and said light component, which has been polarized linearly in said second direction, from each other, two said light components being included in part of said light beam, which part has passed through said sample and then through said beam trap, (ix) a first light receiving optical means for condensing said light component, which has been polarized linearly in said first direction, said light component having been separated by said polarization beam splitter from said light component, which has been polarized linearly in said second direction, an image of the condensed light component being thereby formed as a point image, (x) a second light receiving optical means for condensing said light component, which has been polarized linearly in said second direction, said light component having been separated by said polarization beam splitter from said light component, which has been polarized linearly in said first direction, an image of the condensed light component being thereby formed as a point image, (xi) a first photodetector for detecting said point image, which has been formed by said first light receiving optical means, and (xii) a second photodetector for detecting said point image, which has been formed by said second light receiving optical means.

The present invention also provides a second scanning microscope comprising:

(i) a sample supporting member on which a sample is supported, (ii) a light source for producing a light beam including a light component, which has been polarized linearly in a first direction, and a light component, which has been polarized linearly in a second direction that intersects perpendicularly to said first direction, (iii) a stop member provided with an opening which has a predetermined shape, said stop member stopping said light beam, (iv) a light projecting optical means for forming an image of part of said light beam, which part has passed through said stop member, said image being formed as a small light spot on said sample, (v) a scanning means which causes said light spot to scan said sample two-dimensionally, (vi) a first analyzer for transmitting only said light component, which has been polarized linearly in said first direction, therethrough, said light component having passed through said sample, (vii) a second analyzer which has a shape corresponding to the shape of said opening of said stop member, said second analyzer transmitting only the direct light component, which has been polarized linearly in said second direction, therethrough, said light component having passed through said sample, (viii) a polarization beam splitter for separating said light component, which has been polarized linearly in said first direction, said light component having passed through said first analyzer, and said light component, which has been polarized linearly in said second direction, said light component having passed through said second analyzer, from each other, (ix) a first light receiving optical means for condensing said light component, which has been polarized linearly in said first direction, said light component having been separated by said polarization beam splitter from said light component, which has been polarized linearly in said second direction, an image of the condensed light component being thereby formed as a point image, (x) a second light receiving optical means for condensing said light component, which has been polarized linearly in said second direction, said light component having been separated by said polarization beam splitter from said light component, which has been polarized linearly in said first direction, an image of the condensed light component being thereby formed as a point image, (xi) a first photodetector for detecting said point image, which has been formed by said first light receiving optical means, and (xii) a second photodetector for detecting said point image, which has been formed by said second light receiving optical means.

The present invention further provides a third scanning microscope comprising:

(i) a sample supporting member on which a sample is supported, (ii) a light source for producing a light beam including a light component, which has a first wavelength, and a light component, which has a second wavelength different from said first wavelength, (iii) a first filter which has a predetermined shape, said first filter transmitting only said light component, which has said first wavelength, therethrough, (iv) a second filter for transmitting only said light component, which has said second wavelength, therethrough, (v) a light projecting optical means for forming an image of the light beam composed of said light components, which have respectively passed through said first filter and said second filter, said image being formed as a small light spot on said sample, (vi) a scanning means which causes said light spot to scan said sample two-dimensionally, (vii) a beam trap having a light blocking part which has a shape corresponding to the shape of said first filter, said beam trap blocking only the direct light component, which has said first wavelength, said direct light component having passed through said sample, (viii) a light splitting means for separating said light component, which has said first wavelength, and said light component, which has said second wavelength, from each other, two said light components being included in part of said light beam, which part has passed through said sample and then through said beam trap, (ix) a first light receiving optical means for condensing said light component, which has said first wavelength, said light component having been separated by said light splitting means from said light component, which has said second wavelength, an image of the condensed light component being thereby formed as a point image, (x) a second light receiving optical means for condensing said light component, which has said second wavelength, said light component having been separated by said light splitting means from said light component, which has said first wavelength, an image of the condensed light component being thereby formed as a point image, (xi) a first photodetector for detecting said point image, which has been formed by said first light receiving optical means, and (xii) a second photodetector for detecting said point image, which has been formed by said secqnd light receiving optical means.

The present invention still further provides a fourth scanning microscope comprising:

(i) a sample supporting member on which a sample is supported, (ii) a light source for producing alight beam including a light component, which has afirst wavelength, and a light component, whichhas a second wavelength different from said first wavelength, (iii) a stop member provided with anopening which has a predetermined shape, said stop member stopping said light beam, (iv) a light projecting optical means for forming an image of part of said light beam, which part has passed through said stop member, said image being formed as a small light spot on said sample, (v) a scanning means which causes said light spot to scan said sample two-dimensionally, (vi) a first filter for transmitting only said light component, which has, said first wavelength, therethrough, said light component having passed through said sample, (vii) a second filter which has a shape corresponding to the shape of said opening of said stopmember, said second filter transmitting only the direct light component, which has said second wavelength, therethrough, said direct light componenthaving passed through said sample, (viii) a light splitting means for separating said light component, which has said first wavelength, said light component having passed through said first filter, and said light component, which has said second wavelength, said light component having passed through said second filter, from each other, (ix) a first light receiving optical means for condensing said light component, which has said first wavelength, said light component having been separated by said light splitting means from said light component, which has said second wavelength, an image of the condensed light component being thereby formed as a point image, (x) a second light receiving optical means for condensing said light component, which has said second wavelength, said light component having been separated by said light splitting means from said light component, which has said first wavelength, an image of the condensed light component being thereby formed as a point image, (xi) a first photodetector for detecting said point image, which has been formed by said first light receiving optical means, and (xii) a second photodetector for detecting said point image, which has been formed by said second light receiving optical means.

With the first scanning microscope in accordance with the present invention, the direct light component, which has been polarized linearly in the first direction and which has passed through the sample, is blocked by the beam trap. As a result, of the part of the light beam which has passed through the beam trap, the light component, which has been polarized linearly in the first direction, is the one which has been scattered by the sample. Therefore, with the first scanning microscope in accordance with the present invention, the point image, which is detected by the first photodetector, is formed by only the aforesaid light component which has been scattered by the sample. Accordingly, when an image is reproduced from a signal generated by the first photodetector, a dark field image of the sample can be obtained.

Also, with the first scanning microscope in accordance with the present invention, the light component, which has been polarized linearly in the second direction and which has passed through the beam trap, includes the direct light component, which has been polarized linearly in the second direction, and the light component which has been scattered by the sample. Therefore, with the first scanning microscope in accordance with the present invention, the point image, which is detected by the second photodetector, is formed by the aforesaid direct light component and the light component which has been scattered by the sample. Accordingly, when an image is reproduced from a signal generated by the second photodetector, a bright field image of the sample can be obtained.

With the second scanning microscope in accordance with the present invention, only the light beam, which has been scattered by the sample, impinges upon the first analyzer. Also, all of the direct light beam, which has passed through the sample, and part of the scattered light beam impinge upon the second analyzer.

Therefore, with the second scanning microscope in accordance with the present invention, the point image, which is detected by the first photodetector, is formed by only the light beam, which has been scattered by the sample. Accordingly, when an image is reproduced from a signal generated by the first photodetector, a dark field image of the sample can be obtained.

Also, with the second scanning microscope in accordance with the present invention, the point image, which is detected by the second photodetector, is formed by the direct light beam, which has passed through the sample, and part of the scattered light beam. Accordingly, when an image is reproduced from a signal generated by the second photodetector, a bright field image of the sample can be obtained.

With the third scanning microscope in accordance with the present invention, the direct light component, which has the first wavelength and which has passed through the sample, is blocked by the beam trap. As a result, of the part of the light beam which has passed through the beam trap, the light component, which has the first wavelength, is the one which has been scattered by the sample. Therefore, with the third scanning microscope in accordance with the present invention, the point image, which is detected by the first photodetector, is formed by only the aforesaid light component which has been scattered by the sample. Accordingly, when an image is reproduced from a signal generated by the first photodetector, a dark field image of the sample can be obtained.

Also, with the third scanning microscope in accordance with the present invention, the light component, which has the second wavelength and which has passed through the beam trap, includes the direct light component, which has the second wavelength, and the light component which has been scattered by the sample. Therefore, with the third scanning microscope in accordance with the present invention, the point image, which is detected by the second photodetector, is formed by the aforesaid direct light component and the light component which has been scattered by the sample. Accordingly, when an image is reproduced from a signal generated by the second photodetector, a bright field image of the sample can be obtained.

With the fourth scanning microscope in accordance with the present invention, only the light beam, which has been scattered by the sample, impinges upon the first filter. Also, all of the direct light beam, which has passed through the sample, and part of the scattered light beam impinge upon the second filter.

Therefore, with the fourth scanning microscope in accordance with the present invention, the point image, which is detected by the first photodetector, is formed by only the light beam, which has been scattered by the sample. Accordingly, when an image is reproduced from a signal generated by the first photodetector, a dark field image of the sample can be obtained.

Also, with the fourth scanning microscope in accordance with the present invention, the point image, which is detected by the second photodetector, is formed by the direct light beam, which has passed through the sample, and part of the scattered light beam. Accordingly, when an image is reproduced from a signal generated by the second photodetector, a bright field image of the sample can be obtained.

As described above, with the first to fourth scanning microscopes in accordance with the present invention, by carrying out an easy operation for selecting whether the signal generated by the first photodetector or the signal generated by the second photodetector is to be utilized, a bright field image or a dark field image of a sample can be obtained selectively.

Also, the point image formed by the direct light component and the scattered light component and the point image formed by the scattered light component alone are obtained simultaneously. Therefore, by utilizing both the signal generated by the first photodetector and the signal generated by the second photodetector, a bright field image and a dark field image of a sample at strictly the same instant can be obtained.

In a confocal scanning microscope in accordance with the present invention, no beam trap need be provided, and dark field photometry is effected with an optical heterodyne process.

Specifically, the present invention also provides a confocal scanning microscope comprising:

(i) a sample supporting member on which a sample is supported, (ii) a light source which produces a light beam, (iii) a light projecting optical means with which an image of said light beam is formed as a small light spot on said sample, (iv) a light receiving optical means with which the light beam having passed through said sample is condensed, and an image of the condensed light beam is formed as a point image, (v) a scanning means which causes said light spot to scan said sample two-dimensionally, (vi) a beam splitting means for splitting said light beam, which has been produced by said light source, into a light beam, which is to be irradiated to said sample, and a reference light beam, which is not to be irradiated to said sample, before said light beam having been produced by said light source impinges upon said sample, (vii) a beam combining means for combining said light beam, which has passed through said sample, and said reference light beam with each other, (viii) a first modulation means for modulating said light beam, which has been radiated out of said beam splitting means and which is to be irradiated to said sample, with a first modulation frequency, (ix) a second modulation means for modulating said reference light beam with a second modulation frequency, which is different from said first modulation frequency, (x) a photodetector for detecting the combined light beam, which has been radiated out of said beam combining means, and (xi) a filter means for obtaining a signal by eliminating beat components, which result from the modulated light beam and the modulated reference light beam, from an output signal generated by said photodetector.

In cases where the filtering process for eliminating the beat components is carried out on the output signal of the photodetector, a signal representing a dark field image is obtained from the filtering process. Such effects will be described hereinbelow.

If the intensity of the light beam, which is to be irradiated to the sample, is represented by A1, the intensity of the reference light beam is represented by A2, the first modulation frequency for the light beam is represented by f1, and the second modulation frequency for the reference light beam is represented by f2, the light beam and the reference light beam are modulated in accordance with the formulas $$A_1 = \overline{A_1} \cos(\nu_1 t + \phi_1) \quad (1)$$

$$A_2 = \overline{A_2} \cos(\nu_2 t + \phi_2) \quad (2)$$

In these formulas, $\overline{A_1}$ and $\overline{A_2}$ represent the amplitudes, $\nu_1$ and $\nu_2$ represent the angular frequencies, where $\nu_1 = 2\pi f_1$ and $\nu_2 = 2\pi f_2$, t represents the time, and $\phi_1$ and $\phi_2$ represent the initial phases.

The light beam, which has passed through the sample, is composed of the zero-order light component and the diffracted light component (scattered light component). The intensity A3 of the diffracted light component is expressed as $$A_3 = \overline{A_3}\cos(v_3 t + \phi_3)$$

where $\overline{A_3}$ represents the amplitude, $v_3$ represents the angular frequency, and $\phi_3$ represents the initial phase.

In such case, the value of the output signal i of the photodetector is expressed as $$i \propto (A_1 + A_2 + A_3)^2 \quad (3)$$

The formulas $$v_1 - v_2 = \Delta v$$

$$\phi_1 - \phi_2 = \Delta\phi_{12}$$

$$\phi_2 - \phi_3 = \Delta\phi_{23}$$

$$\phi_3 - \phi_1 = \Delta\phi_{31}$$

are set. The modulation frequency for the diffracted light component is equal to the modulation frequency for the light beam, which is to be irradiated to the sample, and therefore $v1 = v3$. Accordingly, the right side of Formula (3) is expressed as $$\begin{aligned}(A_1 + A_2 + A_3)^2 &= \overline{A_1 A_2}\cos(\Delta vt + \Delta\phi_{12}) + \\ &\quad \overline{A_2 A_3}\cos(-\Delta vt + \Delta\phi_{23}) + \\ &\quad \overline{A_3 A_1}\cos(\Delta\phi_{31}) \\ &= \overline{A_2}\cos\Delta vt(\overline{A_1}\cos\Delta\phi_{12} + \overline{A_3}\cos\Delta\phi_{23}) + \\ &\quad \overline{A_2}\sin\Delta vt(\overline{A_3}\sin\Delta\phi_{23} - \overline{A_1}\sin\Delta\phi_{12}) + \\ &\quad \overline{A_3 A_1}\cos(\Delta\phi_{31}) \\ &= k\sin(\Delta vt + \Phi) + \\ &\quad \overline{A_3 A_1}\cos(\Delta\phi_{31}) \end{aligned} \quad \begin{aligned}(4)\\ \\ \\ \\ \\ (5)\end{aligned}$$

The first term of Formula (5) results from the first and second terms of Formula (4).

As described above, a signal is obtained from the photodetector which signal is composed of the component, which has been modulated with the beat frequency $\Delta f = \Delta v/2\pi = f1 - f2$ [the first term of Formula (5)], and the other component. The component, which has not been modulated with the beat frequency $\Delta f$, is only the light component diffracted by the sample. Therefore, when the aforesaid filtering process is carried out and a signal composed only of the component, which has not been modulated with the beat frequency, is thereby obtained, the signal thus obtained represents a dark field image. Accordingly, the dark field image of the sample can be reproduced from this signal.

In cases where the aforesaid filtering process is not carried out on the output of the photodetector, a signal can be obtained which represents a bright field image. Therefore, by reproducing an image from this signal, the bright field image of the sample can be obtained. In this manner, with the confocal scanning microscope in accordance with the present invention, both a dark field image and a bright field image can be obtained.

Also, with the confocal scanning microscope in accordance with the present invention, the output of the photodetector may be divided into two signals. One of the two signals may be subjected to the aforesaid filtering process, and the other signal may not be subjected thereto. In this manner, both the bright field image and the dark field image of a single sample plane can be obtained simultaneously. Therefore, by combining the bright field image and the dark field image of a single sample plane with each other, an image can be obtained in which the state of the brightness and darkness of the whole sample is illustrated and in which the contour part of the sample is illustrated as a dark field image.

As described above, with the confocal scanning microscope in accordance with the present invention, the dark field photometric technique is effected with the electric processing. Therefore, the optical means need not be provided with a beam trap, and the confocal scanning microscope becomes easy to operate. Also, in cases where the light projecting optical means and the light receiving optical means are supported on a movable member, and the scanning with the light spot is carried out by moving the movable member, the weight of the movable member can be kept light because of the absence of the beam trap. Therefore, the speed, with which the sample is scanned with the light spot, can be kept high.

DESCRIPTION OF THE PREFERRED EMBODIMENTS

The present invention will hereinbelow be described in further detail with reference to the accompanying drawings.

Embodiments of the scanning microscope in accordance with the present invention will be described hereinbelow.

Figure 1:
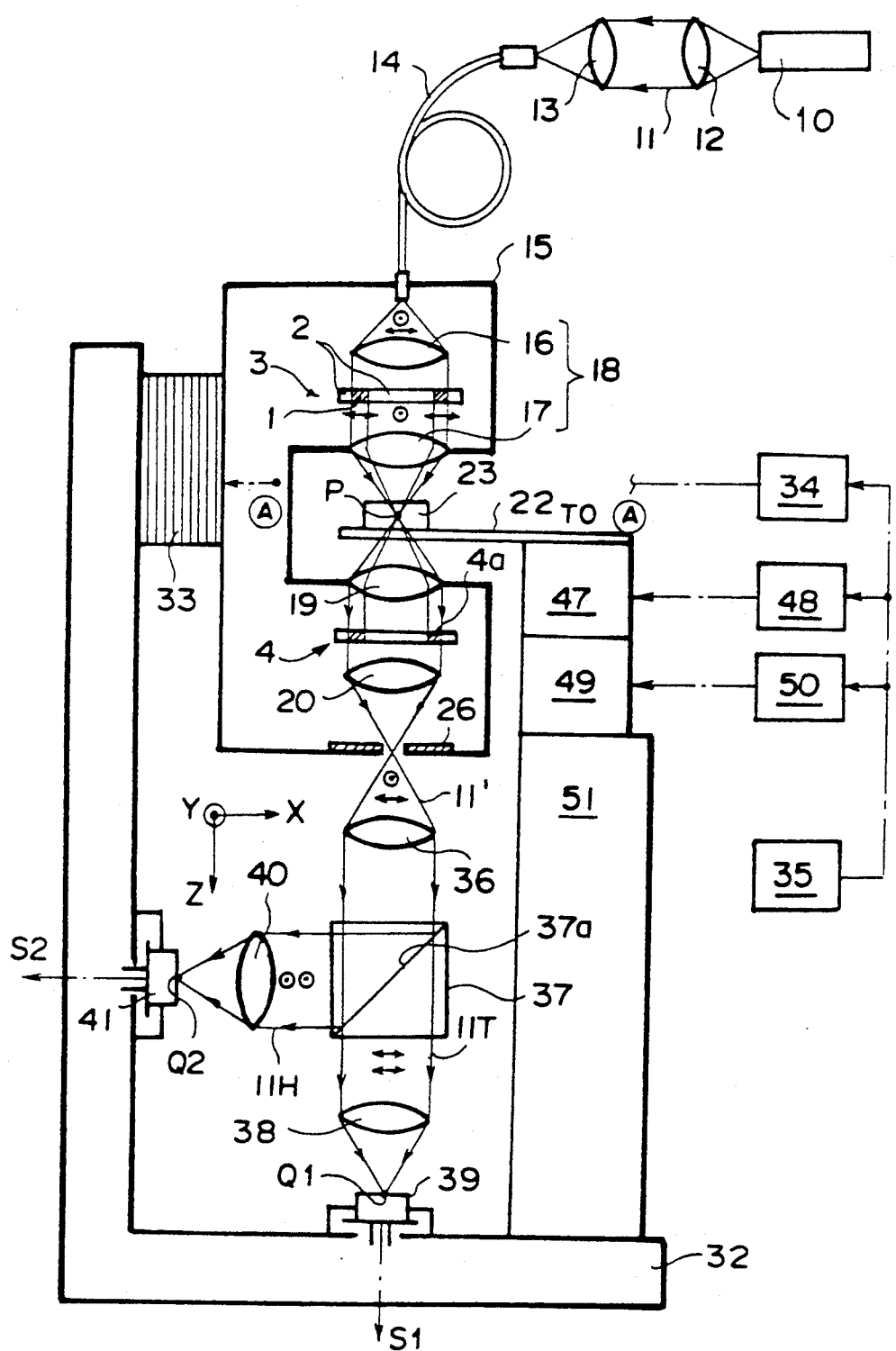
FIG. 1 is a partially cutaway front view showing a first embodiment of the scanning microscope in accordance with the present invention.

FIG. 1 shows a first embodiment of the scanning microscope in accordance with the present invention. This embodiment is of the confocal scanning transmission type. As illustrated in FIG. 1, a monochromatic light laser 10 produces a laser beam 11, which serves as a light beam to be irradiated to a sample. The unpolarized laser beam 11 is collimated by a collimator lens 12. The collimated laser beam 11 is then condensed by a converging lens 13 and impinges upon an optical fiber 14.

Figure 2:
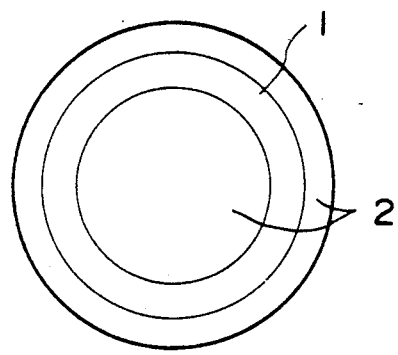
FIG. 2 is a plan view showing a compound polarizing plate employed in the first embodiment of the scanning microscope in accordance with the present invention.

One edge of the optical fiber 14 is secured to a movable member 15. The laser beam 11, which has been guided through the optical fiber 14, is radiated out of the edge of the optical fiber 14, which is secured to the movable member 15. At this time, the edge of the optical fiber 14 radiates the laser beam 11 like a point light source. A light projecting optical means 18, which is composed of a collimator lens 16 and an objective lens (a condensing lens) 17, is secured to the movable member 15. A compound polarizing plate 3 is located between the collimator lens 16 and the objective lens 17. As illustrated in FIG. 2, the compound polarizing plate 3 is composed of a first ring-like polarizer 1 and a second polarizer 2. The second polarizer 2 is constituted of two parts which are located respective on the side inward from the first polarizer 1 and on the side outward from the first polarizer 1. The first polarizer 1 transmits only a light component, which has been polarized linearly in the transverse direction in FIG. 1. This direction of polarization will hereinbelow be referred to as a first direction and is indicated by the double headed arrow in FIG. 1. The second polarizer 2 transmits only a light component, which has been polarized linearly in the direction normal to the plane of the sheet of FIG. 1. The direction of polarization, which is normal to the plane of the sheet of FIG. 1, will hereinbelow be referred to as a second direction and is indicated by a circle having a dot in the middle in FIG. 1.

In this embodiment, the monochromatic light laser 10, which produces the unpolarized laser beam 11, is employed as a light source. Alternatively, a light source may be employed which produces light, which has been polarized linearly in a certain direction, and light, which has been polarized linearly in a direction intersecting perpendicularly to the certain direction.

Figure 3:
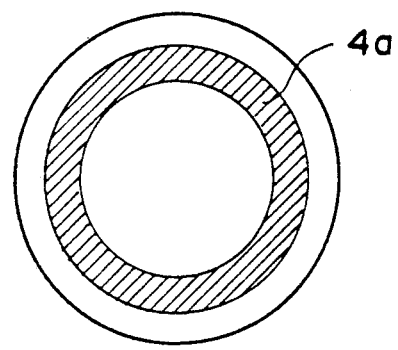
FIG. 3 is a plan view showing a beam trap employed in the first embodiment of the scanning microscope in accordance with the present invention.

An objective lens 19 and a condensing lens 20 are also secured to the movable member 15. A beam trap 4 is located between the objective lens 19 and the condensing lens 20. As illustrated in FIG. 3, the beam trap 4 is provided with a ring-like light blocking part 4a. The light projecting optical means 18 and the lenses 19, 20 are secured to the movable member 15 such that their optical axes align with each other. Also, a sample supporting member 22, which is independent of the movable member 15, is located between the light projecting optical means 18 and the objective lens 19. The sample supporting member 22 and the movable member 15 are supported on a frame 32 in the manner which will be described later.

The laser beam 11 is collimated by the collimator lens 16, and the collimated laser beam 11 impinges upon the compound polarizing plate 3. Of the laser beam 11, only the light component, which has been polarized linearly in the first direction, passes through the first polarizer 1. Also, only the light component, which has been polarized linearly in the second direction, passes through the second polarizer 2. The first polarizer 1 has the shape described above. Therefore, the part of the laser beam 11, which has passed through the first polarizer 1, takes on the form of an annular band-like laser beam. The laser beam 11, which is now composed of only the two polarized light components, is condensed by the objective lens 17. In this manner, a small light spot P is formed on the sample 23 (i.e. on the surface or in the inside of the sample 23), which is placed on the sample supporting member 22.

The laser beam (the direct light component) 11', which has passed through the sample 23, is collimated by the objective lens 19. The collimated laser beam 11' passes through the beam trap 4, and is then converged by the condensing lens 20. At the position at which the collimated laser beam 11' converges, a pinhole plate 26 is secured to the movable member 15. The laser beam 11' passes through the pinhole of the pinhole plate 26. Thereafter, the laser beam 11' impinges upon a collimator lens 36, which is secured to the frame 32. The laser beam 11', which has been collimated by the collimator lens 36, impinges upon a polarization beam splitter 37 having a film surface 37a. Of the laser beam 11', the light component, which impinges as P-polarized light upon the film surface 37a, (i.e. the light component, which has been polarized linearly in the first direction) passes through the film surface 37a. Also, the light component, which impinges as S-polarized light upon the film surface 37a, (i.e. the light componen, which has been polarized linearly in the second direction) is reflected by the film surface 37a.

The light component 11T, which has passed through the film surface 37a, is condensed by a condensing lens 38, which constitutes a first light receiving optical means together with the lenses 19, 20, and 36. In this manner, a point image Q1 is formed by the light component 11T. The point image Q1 is detected by a first photodetector 39, which may be constituted of a photomultiplier, or the like. The first photodetector 39 generates a signal S1, which represents the brightness of the point image Q1. The light component 11H, which has been reflected by the film surface 37a, is condensed by a condensing lens 40, which constitutes a second light receiving optical means together with the lenses 19, 20, and 36. In this manner, a point image Q2 is formed by the light component 11H. The point image Q2 is detected by a second photodetector 41, which may be constituted of a photomultiplier, or the like. The second photodetector 41 generates a signal S2, which represents the brightness of the point image Q2.

How the sample 23 is two-dimensionally scanned with the light spot P of the laser beam 11 will be described hereinbelow.

A laminated piezo-electric device 33 is located between the movable member 15 and the frame 32. The laminated piezo-electric device 33 receives operating electric power from a piezo-electric device operating circuit 34 and reciprocally moves the movable member 15 at high speeds in the main scanning directions indicated by the arrow X. The optical fiber 14 is flexible and allows the movable member 15 to move while the laser beam 11 is being guided through the optical fiber 14.

Laminated piezo-electric devices 47 and 49 are located between the sample supporting member 22 and the frame 32. The laminated piezo-electric device 47 receives operating electric power from a piezo-electric device operating circuit 48 and reciprocally moves the sample supporting member 22 at high speeds in the sub-scanning directions Y, which directions are normal to the plane of the sheet of FIG. 1. In this manner, the sample supporting member 22 is moved with respect to the movable member 15, and the sample 23 is scanned with the light spot P in the sub-scanning directions Y, which are normal to the main scanning directions indicated by the arrow X. The sub-scanning speed is sufficiently lower than the main scanning speed. Therefore, the sample 23 does not fly out of its correct position when the sample supporting member 22 is moved.

In the manner described above, the sample 23 is two-dimensionally scanned with the light spot P. As a result, the serial signals S1 and S2 representing the two-dimensional enlarged images of the sample 23 are obtained from the first photodetector 39 and the second photodetector 41. By way of example, each of the signals S1 and S2 is sampled with a predetermined period, and a signal divided into picture elements is thereby obtained.

The size of the ring-like light blocking part 4a of the beam trap 4 is adjusted such that all of the light component, which has passed through the first polarizer 1 and which has then passed through the sample 23, (i.e. the direct light component, which has been polarized linearly in the first direction) can be blocked by the ring-like light blocking part 4a. As a result, the light component 11T, which has passed through the film surface 37a of the polarization beam splitter 37, is constituted of only the light component which has been scattered by the sample 23. Therefore, the point image Q1, which is detected by the first photodetector 39, is formed by only the scattered light component. On the other hand, all of the light component, which has passed through the second polarizer 2 and which has then passed through the sample 23, (i.e. the direct light component, which has been polarized linearly in the second direction) is reflected by the film surface 37a of the polariza 37. The light component, which has been polarized linearly in the second direction and which has been scattered by the sample 23, is also reflected by the film surface 37a. Therefore, the point image Q2, which is detected by the second photodetector 41, is formed by the direct light component and the scattered light component.

Therefore, the enlarged image of the sample 23, which is represented by the signal S1 generated by the first photodetector 39, is obtained as a dark field image. The enlarged image of the sample 23, which is represented by the signal S2 generated by the second photodetector 41, is obtained as a bright field image. Accordingly, by feeding the signals S1 and S2 respectively to independent image reproducing apparatuses, both the dark field image and the bright field image of the sample 23 at exactly the same instant can be reproduced. Alternatively, in order for the dark field image and the bright field image of the sample 23 at exactly the same instant to be reproduced, one of the signals S1 and S2 may be fed into a single image reproducing apparatus, and the other signal may be stored on a storage means. The other signal may then be read from the storage means and fed into the image reproducing apparatus.

In cases where only either one of the bright field image and the dark field image of the sample 23 is to be obtained, the signal S1 or the signal S2 may be selectively fed via a switching means into a single image reproducing apparatus. In such cases, change-over between the bright field image and the dark field image can be carried out very easily by operating the switching means.

In this embodiment, the photodetectors 39 and 41 are secured to the frame 32. During the main scanning with the laser beam 11, the movable member 15 is moved with respect to the frame 32. Therefore, photodetectors having a comparatively wide light receiving face are employed as the photodetectors 39 and 41. Alternatively, the photodetectors 39, 41, the lenses 36, 38, 40, and the polarization beam splitter 37 may be secured to the movable member 15. When the laser beam 11', which has passed through the sample 23, is detected via the pinhole plate 26, a halo of the laser beam 11' and other unnecessary light can be blocked by the pinhole plate 26.

The upper edge of the laminated piezo-electric device 49 is secured to the laminated piezo-electric device 47 for the sub-scanning. The lower edge of the laminated piezo-electric device 49 is secured to a coarsely movable stage 51, which is in turn secured to the frame 32. The laminated piezo-electric device 49 receives operating electric power from a piezo-electric device operating circuit 50 and moves the laminated piezo-electric device 47, which supports the sample supporting member 22, in the directions indicated by the arrow Z, which directions are normal to the main scanning directions indicated by the arrow X and the sub-scanning directions Y. The two-dimensional scanning with the light spot P is carried out each time the sample supporting member 22 is moved a predetermined distance along the directions indicated by the arrow Z. In this manner, only the information at the focusing plane can be detected by the photodetectors 39 and 41. The signals S1 and S2 generated by the photodetectors 39 and 41 may be stored on a frame memory. In this manner, signals can be obtained which represent the image information at every focusing plane within the range of movement of the sample 3 along the directions indicated by the arrow Z.

A control circuit 35 feeds synchronizing signals to the piezo-electric device operating circuits 34, 48, and 50. The synchronizing signals synchronize the scanning with the light spot P in the main and sub-scanning directions, and the movement of the sample supporting member 22 in the directions along the optical axis with each other. The coarsely movable stage 51 can be moved manually or by an operating means in the directions Y. By thus moving the sample supporting member 22 by the coarsely movable stage 51, the sample 23 can be easily replaced by a new one.

Instead of the sub-scanning with the light spot P being carried out by the movement of the sample supporting member 22, the sub-scanning with the light spot P may be effected by moving the movable member 15. Also, instead of the laminated piezo-electric devices being used to move the movable member 15 and the sample supporting member 22, scanning techniques utilizing a voice coil, a tuning fork, natural oscillation of a solid with ultrasonic waves, or the like, may be utilized to move the movable member 15 and the sample supporting member 22.

Figure 4:
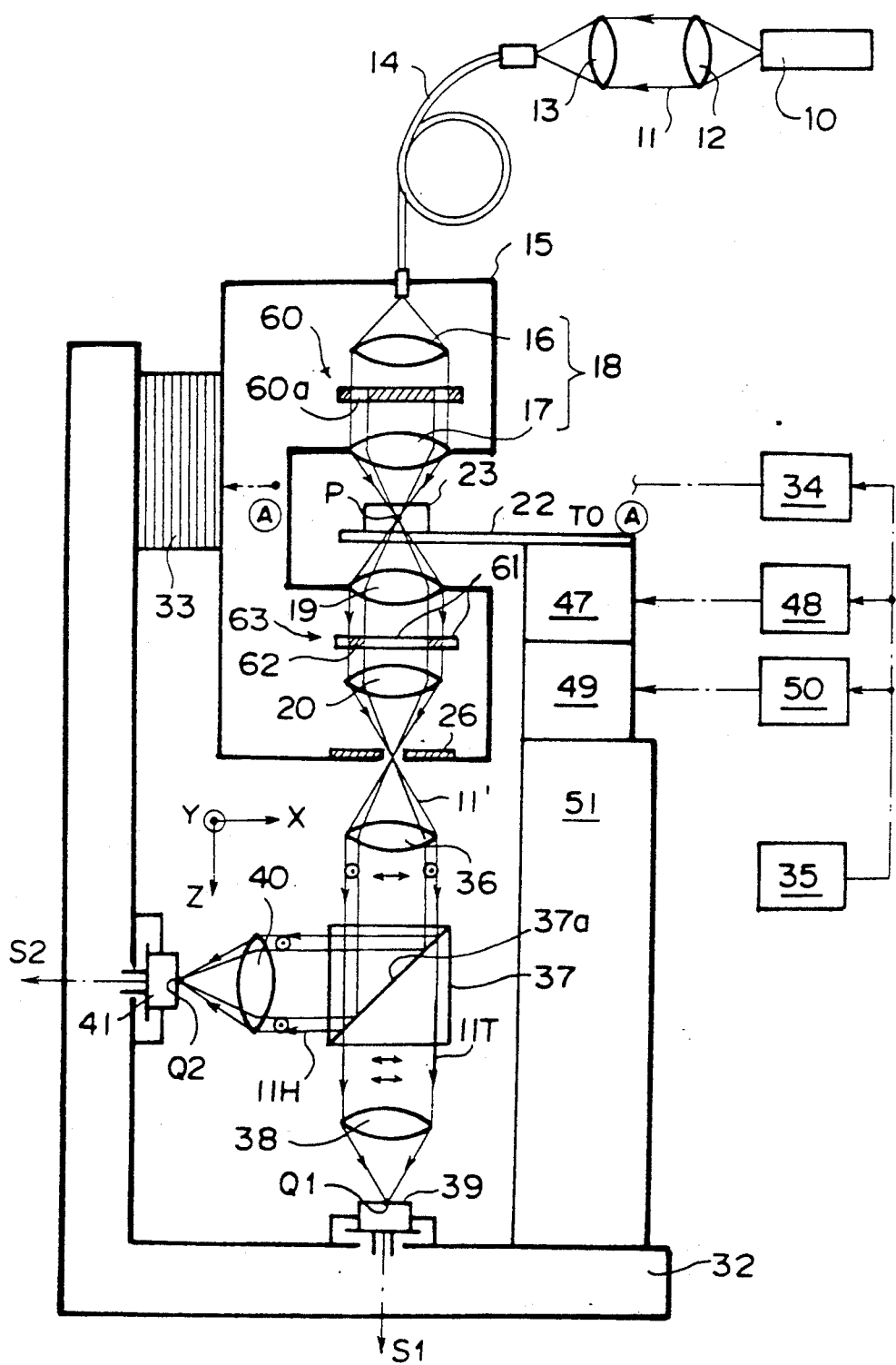
FIG. 4 is a partially cutaway front view showing a second embodiment of the scanning microscope in accordance with the present invention.
Figure 5:
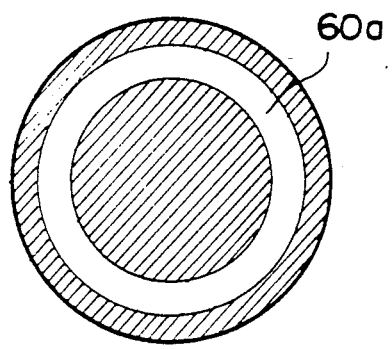
FIG. 5 is a plan view showing a ring stop employed in the second embodiment of the scanning microscope in accordance with the present invention.
Figure 6:
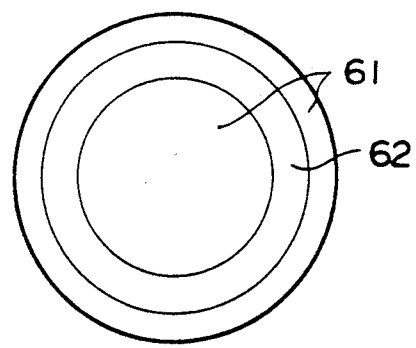
FIG. 6 is a plan view showing a compound analyzing plate employed in the second embodiment of the scanning microscope in accordance with the present invention.

A second embodiment of the scanning microscope in accordance with the present invention will be described hereinbelow with reference to FIGS. 4, 5, and 6. In FIGS. 4, similar elements are numbered with the same reference numerals with respect to FIG. 1. (This also applies to the figures that follow.)

With reference to FIG. 4, this embodiment differs from the first embodiment shown in FIG. 1 in that a ring stop 60 is employed in lieu of the compound polarizing plate 3, and a compound analyzing plate 63 is employed in lieu of the beam trap 4. As illustrated in FIG. 5, the ring stop 60 is constituted of a light blocking material and is provided with a ring-like opening (a light transmitting part) 60a. As illustrated in FIG. 6, the compound analyzing plate 63 is composed of a first analyzer 61 and a second analyzer 62, which are combined with each other. The second analyzer 62 has a ring-like shape. The first analyzer 61 is cosntituted of two parts, one of which is located on the side inward from the second analyzer 62 and the other of which is located on the side outward from the second analyzer 62. The first analyzer 61 transmits only the light component, which has been polarized linearly in the first direction. The second analyzer 62 transmits only the light component, which has been polarized linearly in the second direction.

In this embodiment, part of the laser beam 11 passes through the ring stop 60 and impinges as an annular band-like laser beam upon the sample 23. Therefore, the laser beam (the direct laser beam) 11', which has passed through the sample 23, also takes on the form of an annular band-like laser beam and impinges upon the compound analyzing plate 63. The shape of the ring-like second analyzer 62 of the compound analyzing plate 63 is identical with the sectional shape of the unpolarized, annular band-like laser beam 11' such that all of the laser beam (the direct laser beam) 11' may impinge upon the second analyzer 62. Therefore, the light component of the laser beam (the direct laser beam) 11', which light component has been polarized linearly in the second direction, is radiated out of the second analyzer 62. Of the part of the laser beam which has been scattered by the sample 23, the scattered light component, which has been polarized linearly in the second direction, is also radiated out of the second analyzer 62. The direct laser beam 11' does not impinge upon the first analzyer 61, but only the part of the laser beam, which has been scattered by the sample 23, impinges thereupon. Therefore, only the scattered light component, which has been polarized linearly in the first direction, is radiated out of the first analyzer 61.

Therefore, in the second embodiment, the point image Q1, which is detected by the first photodetector 39, is formed by only the scattered light component. On the other hand, the point image Q2, which is detected by the second photodetector 41, is formed by the direct light component and the scattered light component.

Therefore, the enlarged image of the sample 23, which is represented by the signal S1 generated by the first photodetector 39, is obtained as a dark field image. The enlarged image of the sample 23, which is represented by the signal S2 generated by the second photodetector 41, is obtained as a bright field image. Accordingly, as in the first embodiment of the scanning microscope in accordance with the present ivnention, both the dark field image and the bright field image of the sample 23 at exactly the same instant can be reproduced from the signals S1 and S2. Alternatively, either one of the dark field image and the bright field image of the sample 23 can be reproduced selectively.

A third embodiment of the scanning microscope in accordance with the present invention will be described hereinbelow with reference to FIGS. 7, 8 and 9.

Figure 7:
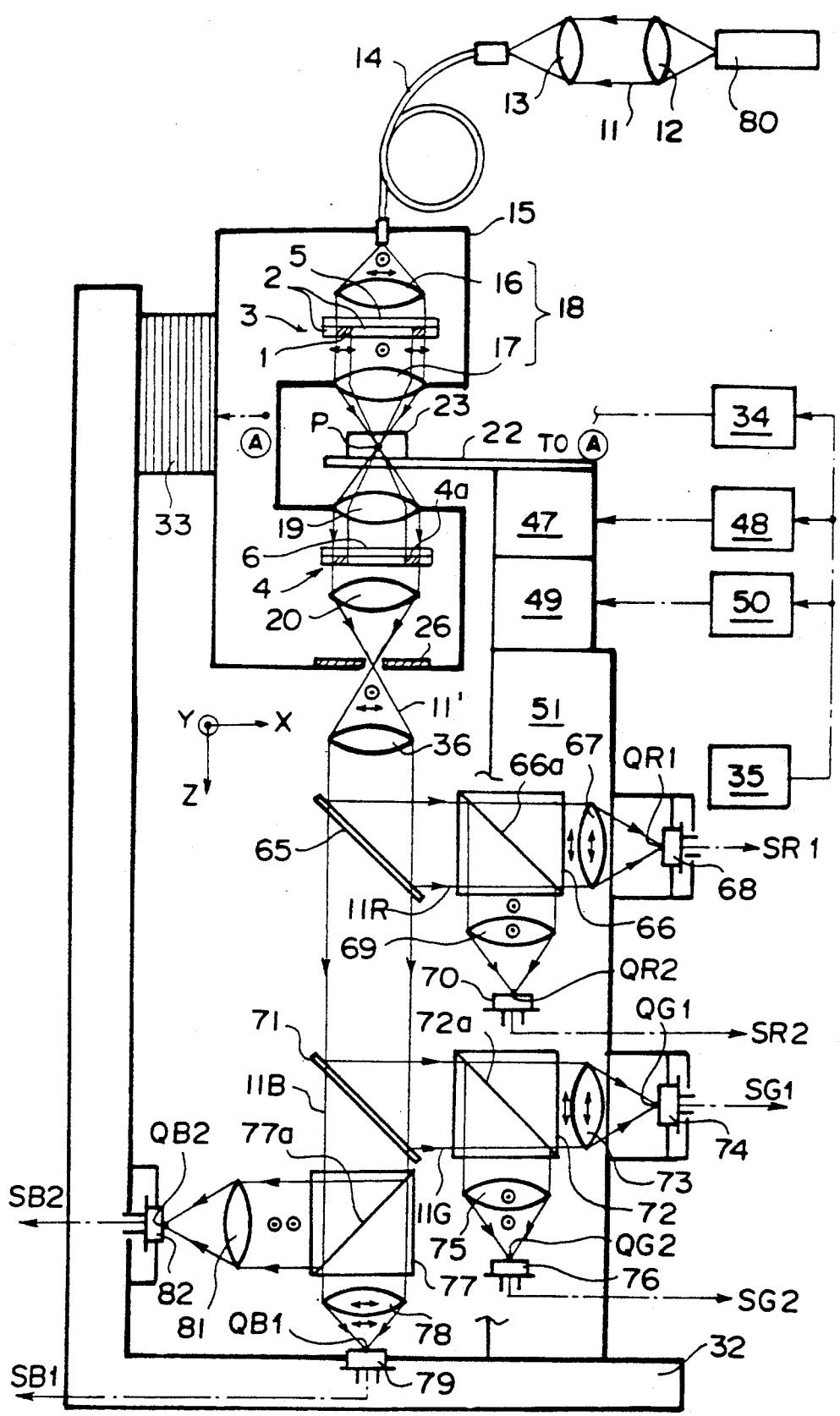
FIG. 7 is a partially cutaway front view showing a third embodiment of the scanning microscope in accordance with the present invention.

As illustrated in FIG. 7, this embodiment is provided with the compound polarizing plate 3 and the beam trap 4, which are the same as those employed in the first embodiment shown in FIG. 1. A compound filter plate 5 is located on the upper surface of the compound polarizing plate 3, and a compound filter plate 6 is located on the upper surface of the beam trap 4. Also, in this embodiment, an RGB laser 80, which produces a laser beam including red light, green light and blue light as the laser beam 11, is employed as the light source.

Figure 8:
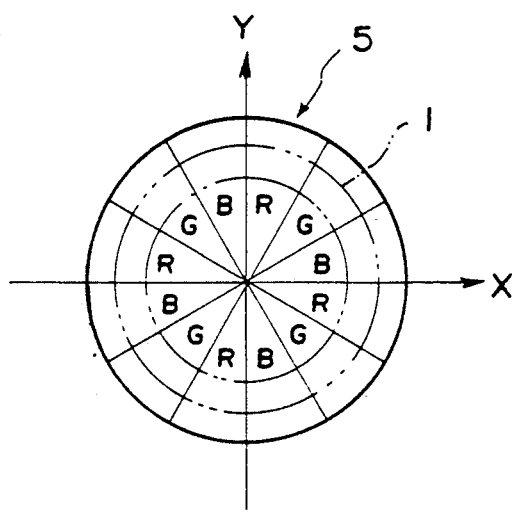
FIG. 8 is a plan view showing a compound filter plate employed in the third embodiment of the scanning microscope in accordance with the present invention.
Figure 9:
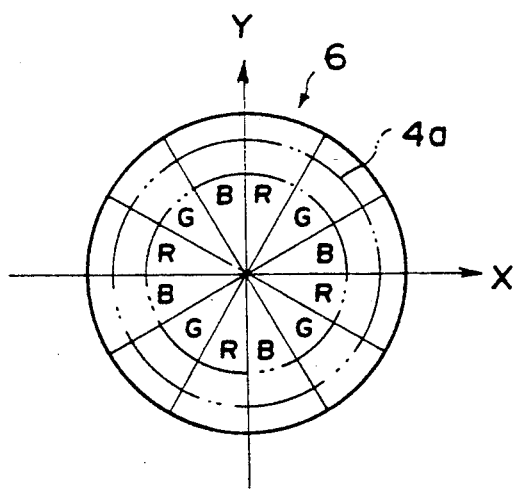
FIG. 9 is a plan view showing a different compound filter plate employed in the third embodiment of the scanning microscope in accordance with the present invention.

As illustrated in FIG. 8, the compound filter plate 5 is composed of a plurality of fan-shaped filters, which are indicated by R, G, and B. The fan-shaped filters R transmits only the red light therethrough. The fan-shaped filters G transmits only the green light therethrough. The fan-shaped filters B transmits only the blue light therethrough. As illustrated in FIG. 9, the compound filter plate 6 is composed of fan-shaped filters R, fan-shaped filters G, and fan-shaped filters B. In each of the compound filter plates 5 and 6, the fan-shaped filters R are shifted by 180° from each other around the optical axis. This also applies to the fan-shaped filters G and the fan-shaped filters B. In FIG. 8, the position of the first polarizer 1 with respect to the position of the compound filter plate 5 is indicated by the chained lines. In FIG. 9, the position of the light blocking part 4a with respect to the compound filter plate 6 is indicated by the chained lines.

In this embodiment, the conditions of polarization of the direct light component and the scattered light component, which impinge upon the collimator lens 36, are the same as those in the first embodiment shown in FIG. 1. Of the direct light component and the scattered light component, the red light 11R is reflected by a dichroic mirror 65 and impinges upon a polarization beam splitter 66 for red light. Of the red light 11R, the light component, which impinges as P-polarized light upon a film surface 66a of the polarization beam splitter 66, (i.e. the light component, which has been polarized linearly in the first direction) passes through the film surface 66a. Also, the light component, which impinges as S-polarized light upon the film surface 66a, (i.e. the light component, which has been polarized linearly in the second direction) is reflected by the film surface 66a.

The red light 11R, which has passed through the film surface 66a, is condensed by a condensing lens 67, and a point image QR1 is thereby formed. The point image QR1 is detected by a first photodetector 68 for red light. The first photodetector 68 generates a signal SR1, which represents the brightness of the point image QR1. The red light 11R, which has been reflected by the film surface 66a, is condensed by a condensing lens 69 and a point image QR2 is thereby formed. The point image QR2 is detected by a second photodetector 70 for red light. The second photodetector 70 generates a signal SR2, which represents the brightness of the point image QR2.

For the same reasons as those described above with reference to the first embodiment shown in FIG. 1, the red light 11R, which has passed through the film surface 66a of the polarization beam splitter 66, is constituted of only the light component, which has been scattered by the sample 23. Therefore, the point image QR1, which is detected by the first photodetector 68, is formed by only the scattered light component. Also, all of the light component, which has passed through the second polarizer 2 and which has then passed through the sample 23, (i.e. the direct light component, which has been polarized linearly in the second direction) is reflected by the film surface 66a of the polarization beam splitter 66. Also, the scattered light component, which has been polarized linearly in the second direction, is reflected by the film surface 66a. Therefore, the point image QR2, which is detected by the second photodetector 70, is formed by the direct light component and the scattered light component. Accordingly, the enlarged image of the sample 23, which is represented by the signal SR1 generated by the first photodetector 68, is obtained as a dark field image. The enlarged image of the sample 23, which is represented by the signal SR2 generated by the second photodetector 70, is obtained as a bright field image.

The direct light component and the scattered light component, which have passed through the dichroic mirror 65, impinge upon a dichroic mirror 71. Of the direct light component and the scattered light component, which have passed through the dichroic mirror 65, the green light 11G is reflected by the dichroic mirror 71 and thereafter impinges upon a polarization beam splitter 72 for green light. Of the green light 11G, the light component, which impinges as P-polarized light upon a film surface 72a of the polarization beam splitter 72, (i.e. the light component, which has been polarized linearly in the first direction) passes through the film surface 72a. Also, the light component, which impinges as S-polarized light upon the film surface 72a, (i.e. the light component, which has been polarized linearly in the second direction) is reflected by the film surface 72a.

The green light 11G, which has passed through the film surface 72a, is condensed by a condensing lens 73, and a point image QG1 is thereby formed. The point image QG1 is detected by a first photodetector 74 for green light. The first photodetector 74 generates a signal SG1, which represents the brightness of the point image QG1 The green light 11G, which has been reflected by the film surface 72a, is condensed by a condensing lens 75, and a point image QG2 is thereby formed. The point image QG2 is detected by a second photodetector 76 for green light. The second photodetector 76 generates a signal SG2, which represents the brightness of the point image QG2.

As in the red light 11R, the point image QG1, which is detected by the first photodetector 74, is formed by only the light component, which has been scattered by the sample 23. Also, the point image QG2, which is detected by the second photodetector 76, is formed by the direct light component, which has passed through the sample 23, and the light component, which have been scattered by the sample 23. Accordingly, the enlarged image of the sample 23, which is represented by the signal SG1 generated by the first photodetector 74, is obtained as a dark field image. The enlarged image of the sample 23, which is represented by the signal SG2 generated by the second photodetector 76, is obtained as a bright field image.

The direct light component and the scattered light component, which have passed through the dichroic mirror 71, (i.e. the blue light 11B) impinge upon a polarization beam splitter 77 for blue light. Of the blue light 11B, the light component, which impinges as P-polarized light upon a film surface 77a of the polarization beam splitter 77, (i.e. the light component, which has been polarized linearly in the first direction) passes through the film surface 77a. Also, the light component, which impinges as S-polarized light upon the film surface 77a, (i.e. the light component, which has been polarized linearly in the second direction) is reflected by the film surface 77a.

The blue light 11B, which has passed through the film surface 77a, is condensed by a condensing lens 78, and a point image QB1 is thereby formed. The point image QB1 is detected by a first photodetector 79 for blue light. The first photodetector 79 generates a signal SB1, which represents the brightness of the point image QB1. The blue light 11B, which has been reflected by the film surface 77a, is condensed by a condensing lens 81, and a point image QB2 is thereby formed. The point image QB2 is detected by a second photodetector 82 for blue light. The second photodetector 82 generates a signal SB2, which represents the brightness of the point image QB2.

As in the red light 11R and the green light 11G, the point image QB1, which is detected by the first photodetector 79, is formed by only the light component, which has been scattered by the sample 23. Also, the point image QB2, which is detected by the second photodetector 82, is formed by the direct light component, which has passed through the sample 23, and the light component, which has been scattered by the sample 23. Accordingly, the enlarged image of the sample 23, which is represented by the signal SB1 generated by the first photodetector 79, is obtained as a dark field image. The enlarged image of the sample 23, which is represented by the signal SB2 generated by the second photodetector 82, is obtained as a bright field image.

Accordingly, when the signals SR1, SG1, and SB1 are fed into a color image reproducing apparatus, a color dark field image of the sample 23 can be reproduced. When the signals SR2, SG2, and SB2 are fed into a color image reproducing apparatus, a color bright field image can be obtained.

In cases where an achromatic process is carried out on the first polarizer 1 and the second polarizer 2 of the compound polarizing plate 3, the compound filter plate 5 and the compound filter plate 6 can be omitted. Also, the second embodiment of the scanning microscope, which is shown in FIG. 4, may be modified such that color images can be formed.

A fourth embodiment of the scanning microscope in accordance with the present invention will be described hereinbelow with reference to FIGS. 10 and 11.

Figure 10:
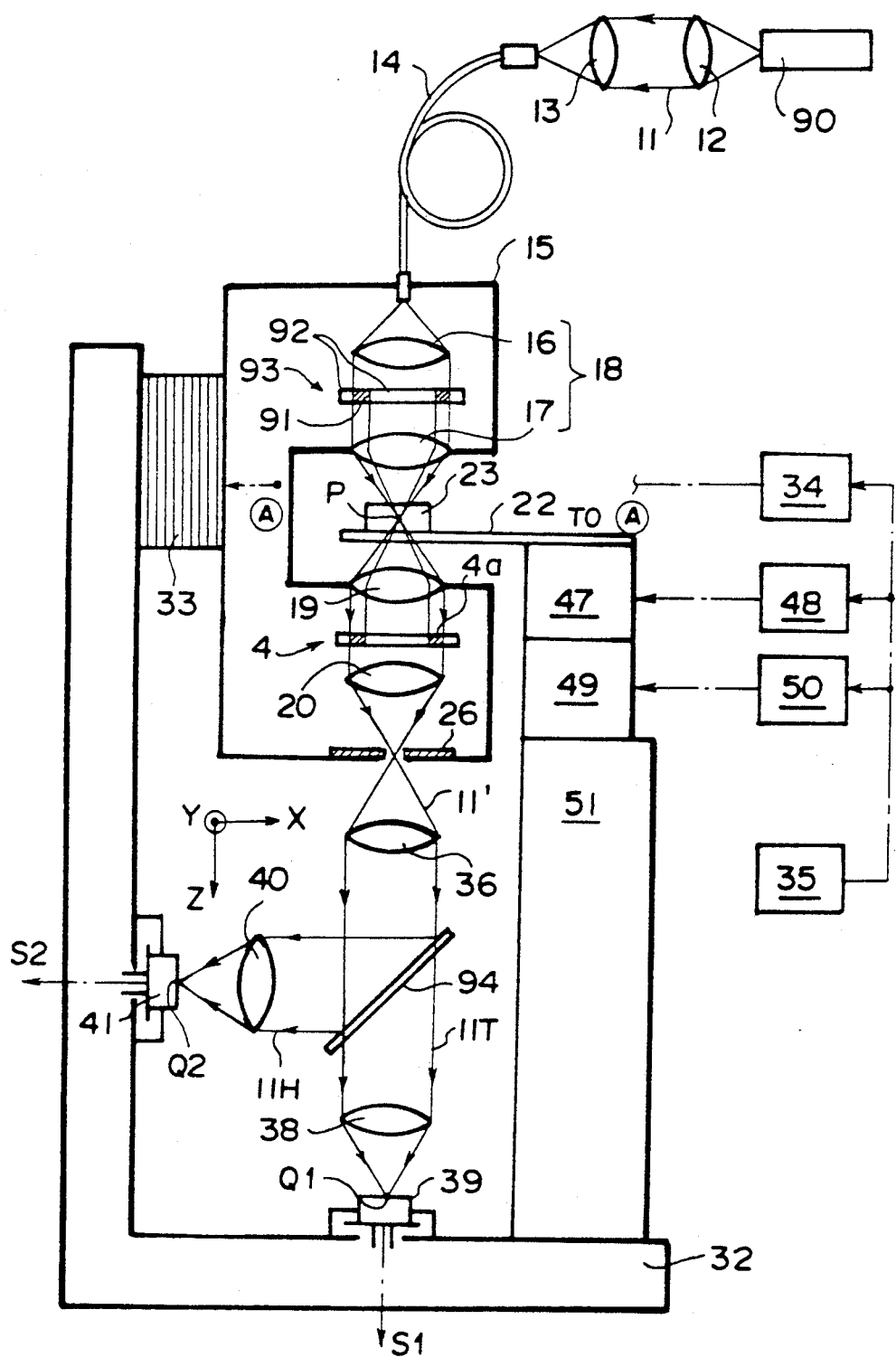
FIG. 10 is a partially cutaway front view showing a fourth embodiment of the scanning microscope in accordance with the present invention.
Figure 11:
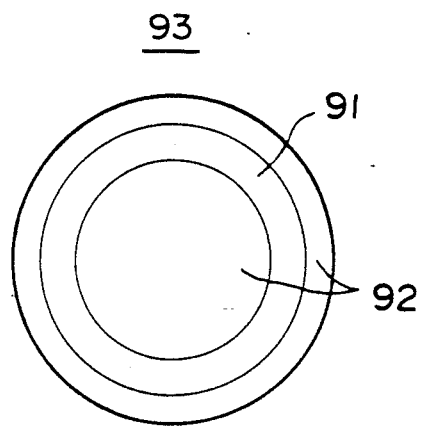
FIG. 11 is a plan view showing a compound filter plate employed in the fourth embodiment of the scanning microscope in accordance with the present invention.

As illustrated in FIG. 10, a laser beam source 90 is employed as the light source. The laser beam source 90 produces a laser beam 11 including a light component, which has a first wavelength $\lambda 1$, and a light component, which has a second wavelength $\lambda 2$. The laser beam source 90 may be constituted of two lasers, which produce laser beams having different wavelengths, and a means for combining the two laser beams. Alternatively, a light beam source may be employed which produces a light beam, such as a white light beam, including the light component, which has the first wavelength $\lambda 1$, and the light component, which has the second wavelength $\lambda 2$.

A compound filter plate 93 is located between the collimator lens 16 and the objective lens 17 of the light projecting optical means 18. As illustrated in FIG. 1, the compound filter plate 93 is composed of a ring-like first filter 91 and a second filter 92. The second filter 92 is constituted of two parts, one of which is located on the side inward from the first filter 91 and the other of which is located on the side outward from the first filter 91. The first filter 91 transmits only the light component, which has the first wavelength $\lambda 1$, therethrough. The second filter 92 transmits only the light component, which has the second wavelength $\lambda 2$, therethrough.

A beam trap 4 is located between the objective lens 19 and the condensing lens 20, which constitute part of a light receiving optical means. The beam trap 4 is of the same type as that employed in the first embodiment of FIG. 1. As illustrated in FIG. 3, the beam trap 4 has the ring-like light blocking part 4a.

The laser beam 11 is collimated by the collimator lens 16, and the collimated laser beam 11 impinges upon the compound filter plate 93. Of the laser beam 11, only the light component, which has the first wavelength $\lambda 1$, passes through the first filter 91. Also, only the light component, which has the second wavelength $\lambda 2$, passes through the second filter 92. The first filter 91 has the shape described above. Therefore, the part of the laser beam 11 (i.e. the light component having the first wavelength $\lambda 1$), which has passed through the first filter 91, takes on the form of an annular band-like laser beam. The laser beam 11, which has passed through the compound filter plate 93, is condensed by the objective lens 17. In this manner, a small light spot P is formed on the sample 23 (i.e. on the surface or in the inside of the sample 23).

The laser beam (the direct light component) 11', which has passed through the sample 23, is collimated by the objective lens 19. The collimated laser beam 11' passes through the beam trap 4, and is then converged by the condensing lens 20. At the position at which the collimated laser beam 11' converges, the pinhole plate 26 is secured to the movable member 15. The laser beam 11' passes through the pinhole of the pinhole plate 26. Thereafter, the laser beam 11' impinges upon the collimator lens 36, which is secured to the frame 32. The laser beam 11', which has been collimated by the collimator lens 36, impinges upon a dichroic mirror 94. The dichroic mirror 94 transmits the light component, which has the first wavelength $\lambda 1$, and reflects the light component, which has the second wavelength $\lambda 2$.

The size of the light blocking part 4a of the beam trap 4 is adjusted such that all of the light component, which has passed through the first filter 91 and which has then passed through the sample 23, (i.e. the direct light component, which has the first wavelength $\lambda 1$) can be blocked by the light blocking part 4a. Therefore, the light component 11T, which has passed through the dichroic mirror 94, is constituted of only the light component, which has been scattered by the sample 23. Therefore, the point image Q1, which is detected by the first photodetector 39, is formed by only the scattered light component.

On the other hand, all of the light component, which has passed through the second filter 92 and has then passed through the sample 23, (i.e. the direct light component, which has the second wavelength $\lambda 2$) is reflected by the dichroic mirror 94. The scattered light component, which has the second wavelength $\lambda 2$, is also reflected by the dichroic mirror 94. Therefore, the point image Q2, which is detected by the second photodetector 41, is formed by the direct light component and the scattered light component.

Therefore, the enlarged image of the sample 23, which is represented by the signal S1 generated by the first photodetector 39, is obtained as a dark field image. The enlarged image of the sample 23, which is represented by the signal S2 generated by the second photodetector 41, is obtained as a bright field image.

A fifth embodiment of the scanning microscope in accordance with the present invention will be described hereinbelow with reference to FIGS. 12 and 13.

Figure 12:
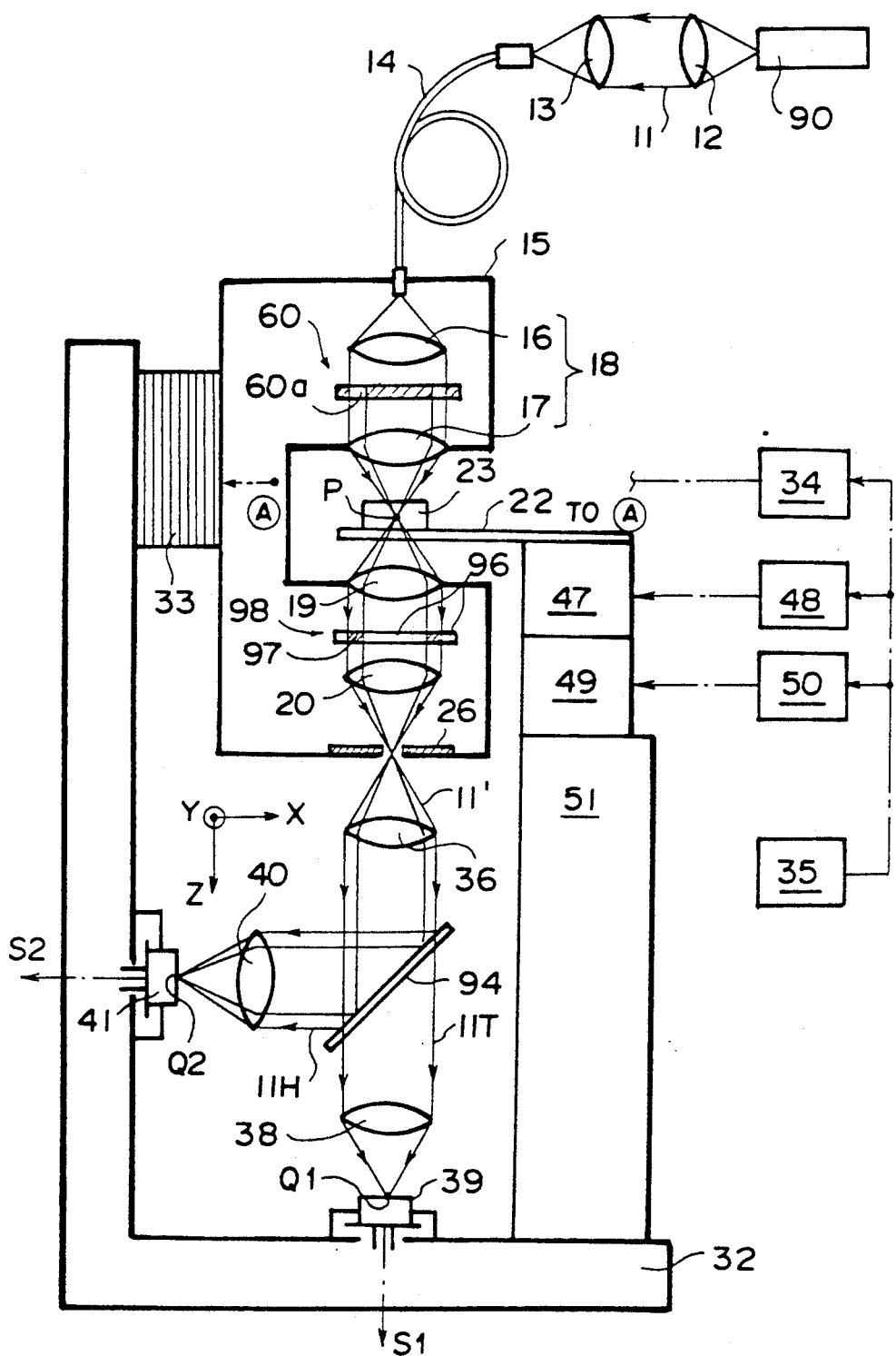
FIG. 12 is a partially cutaway front view showing a fifth embodiment of the scanning microscope in accordance with the present invention.

The fifth embodiment shown in FIG. 12 differs from the fourth embodiment shown in FIG. 10 in that a ring stop 60 is employed in lieu of the compound filter plate 93, and a compound filter plate 98 is employed in lieu of the beam trap 4. The ring stop 60 is of the same type as that employed in the second embodiment of FIG. 4. As shown in FIG. 5, the ring stop 60 is constituted of a light blocking material and has the ring-like light transmitting part 60a.

Figure 13:
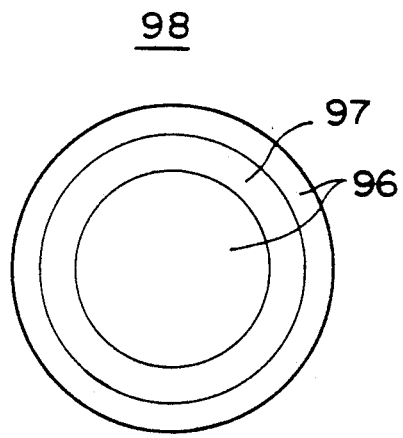
FIG. 13 is a plan view showing a compound filter plate employed in the fifth embodiment of the scanning microscope in accordance with the present invention.

As illustrated in FIG. 13, the compound filter plate 98 is composed of a first filter 96 and a second filter 97, which are combined with each other. The second filter 97 has a ring-like shape. The first filter 96 is constituted of two parts, one of which is located on the side inward from the second filter 97 and the other of which is located on the side outward from the second filter 97. The first filter 96 transmits only the light component, which has the first wavelength $\lambda 1$, therethrough. The second filter 97 transmits only the light component, which has the second wavelength $\lambda 2$, therethrough.

In this embodiment, part of the laser beam 11 passes through the ring stop 60 and impinges as an annular band-like laser beam upon the sample 23. Therefore, the laser beam (the direct laser beam) 11', which has passed through the sample 23, also takes on the form of an annular band-like laser beam and impinges upon the compound filter plate 98. The shape of the ring-like second filter 97 of the compound filter plate 98 is identical with the sectional shape of the annular band-like laser beam 11' such that all of the laser beam (the direct laser beam) 11' may impinge upon the second filter 97. Therefore, the light component of the laser beam (the direct laser beam) 11', which light component has the second wavelength $\lambda 2$, is radiated out of the second filter 97. Of the part of the laser beam which has been scattered by the sample 23, the scattered light component, which has the second wavelength $\lambda 2$, is also radiated out of the second filter 97. The direct laser beam 11' does not impinge upon the first filter 96, but only the part of the laser beam, which has been scattered by the sample 23, impinges thereupon. Therefore, only the scattered light component, which has the first wavelength $\lambda 1$, is radiated out of the first filter 96.

Therefore, in the fifth embodiment, the point image Q1, which is detected by the first photodetector 39, is formed by only the scattered light component. On the other hand, the point image Q2, which is detected by the second photodetector 41, is formed by the direct light component and the scattered light component.

Therefore, the enlarged image of the sample 23, which is represented by the signal S1 generated by the first photodetector 39, is obtained as a dark field image. The enlarged image of the sample 23, which is represented by the signal S2 generated by the second photodetector 41, is obtained as a bright field image.

The aforesaid embodiments of the scanning microscope in accordance with the present invention are applied to confocal scanning microscopes. The scanning microscope in accordance with the present invention is also applicable to scanning microscopes of types other than the confocal type.

Embodiments of the confocal scanning microscope in accordance with the present invention, wherein no beam trap need be used, will be described hereinbelow.

Figure 14:
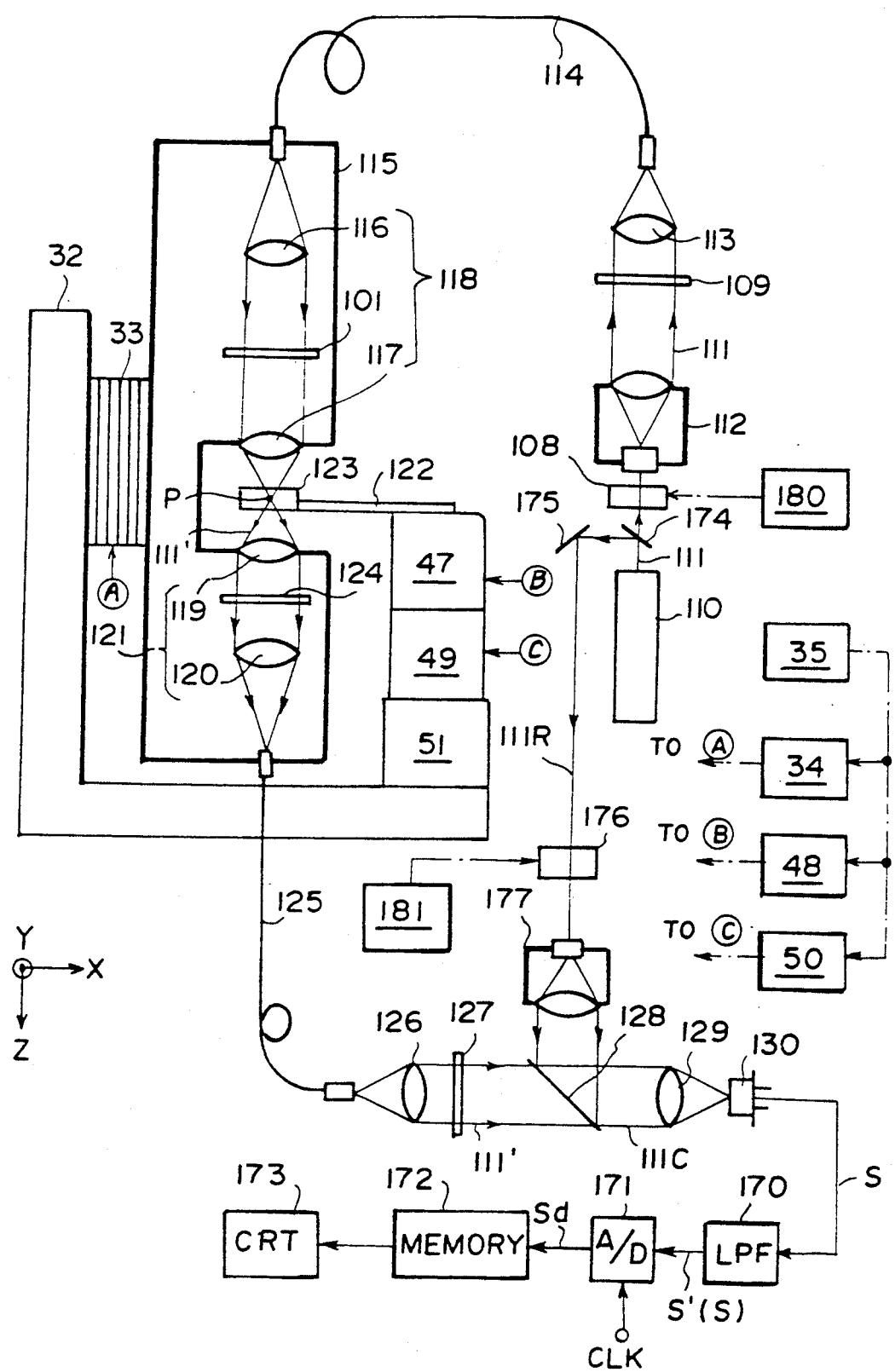
FIG. 14 is a schematic side view showing an embodiment of the confocal scanning microscope in accordance with the present invention.

FIG. 14 shows an embodiment of the confocal scanning type of phase contrast microscope in accordance with the present invention. This embodiment is of the transmission type. As illustrated in FIG. 14, a monochromatic light laser 110 produces a laser beam 111, which serves as a light beam to be irradiated to a sample. Part of the laser beam 111, which has been polarized linearly, passes through a semi-transparent mirror 174, which will be described later, and then passes through a first acousto-optic modulator (a first AOM) 108. A beam expander 112 increases the beam diameter of the laser beam 111. The laser beam 111 then passes through a halfwave plate 109 for adjusting the plane of polarization. The laser beam 11, which has passed through the halfwave plate 109, is condensed by a converging lens 113 and impinges upon a polarization plane keeping optical fiber 114.

One edge of the optical fiber 114 is secured to a movable member 115. The laser beam 111, which has been guided through the optical fiber 114, is radiated out of the edge of the optical fiber 114, which is secured to the movable member 115. At this time, the edge of the optical fiber 114 radiates the laser beam 111 like a point light source. A light projecting optical means 118 is secured to the movable member 115. The light projecting optical means 118 is composed of a collimator lens 116 and an objective lens (a condensing lens) 117. A quarter-wave plate 101 is located between the collimator lens 116 and the objective lens 117.

A light receiving optical means 121 is also secured to the movable member 115. The light receiving optical means 121 is composed of an objective lens 119 and a condensing lens 120. A quarter-wave plate 124 is located between the collimator lens 119 and the objective lens 120. The light projecting optical means 118 and the light receiving optical means 121 are secured to the movable member 115 such that their optical axes align with each other. Also, a sample supporting member 122, which is independent of the movable member 115, is located between the light projecting optical means 118 and the light receiving optical means 121.

The laser beam 111 is collimated by the collimator lens 116, and the collimated laser beam 111 is then converted by the quarter-wave plate 101 into a circularly polarized laser beam. The laser beam 111 is then condensed by the objective lens 117. In this manner, an image of the condensed laser beam 111 is formed as a small light spot P on a sample 123 (i.e. on the surface of the sample 123 or in the inside thereof), which is placed on the sample supporting member 122. A laser beam 111', which has passed through the sample 123, is collimated by the objective lens 119 of the light receiving optical means 121. The collimated laser beam 111' passes through the quarter-wave plate 124 and is converted thereby into a linearly polarized laser beam. Thereafter, the laser beam 111' is condensed by the condensing lens 120, and a point image of the condensed laser beam 111' is thereby formed. One edge of a polarization plane keeping optical fiber 125 is secured to the movable member 115 at the position, at which the point image is formed. The laser beam 111' impinges upon the edge of the optical fiber 125 and enters the optical fiber 125. The laser beam 111' includes the laser beam, which haspassed through the sample 123 as the zero-order light component, and the diffracted light component, which has been diffracted by the sample 123.

The laser beam 111', which has been guided through the optical fiber 125, is radiated out of the other edge of the optical fiber 125 and is collimated by a collimator lens 126. Thereafter, the collimated laser beam 111' passes through a halfwave plate 127 for adjusting the plane of polarization and impinges upon a semi-transparent mirror 128. By the semi-transparent mirror 128, the laser beam 111' is combined with a reference laser beam 111R, which will be described later. The combined laser beam 111C, which has thus been obtained, is condensed by a condensing lens 129 and is detected by a photodetector 130. The photodetector 130 may be constituted of a photomultiplier, or the like. The photodetector 130 generates a signal S representing the amount of the combined laser beam 111C.

In this embodiment, the laser beam 111 is converted by the quarter-wave plate 101 into the circularly polarized laser beam and is then caused to impinge upon the sample 123. The laser beam 111' is then converted by the quarter-wave plate 124 into the linearly polarized light. In this manner, only the laser beam 111', which has been polarized linearly in a predetermined direction, is detected. Therefore, unnecessary light around the sample 123 is not detected by the photodetector 130.

The two-dimensional scanning of the sample 123 with the light spot P, the movement of the sample supporting member 122 in the directions Z, and the movement of the coarsely movable stage 51 are carried out in the same manner as that in the aforesaid embodiments of the scanning microscope in accordance with the present invention.

By way of example, the frequency of the reciprocal movement of the movable member 115 in the directions X is set as being 10 kHz. In such cases, if the main scanning width is equal to 100 μm, the main scanning speed will be equal to $$10 \times 10^3 \times 100 \times 10^{-6} \times 2 = 2 m/s$$

Also, by way of example, the time required for the sub-scanning is set as being 1/20 second. In such cases, if the sub-scanning width is equal to 100 mm, the sub-scanning speed will be equal to $$20 \times 100 \times 10^{-6} = 0.002 \ m/s$$
$$= 2 \ mm/s$$

Specifically, the sub-scanning speed is sufficiently lower than the main scanning speed. When the sub-scanning speed is as low as this level, the sample 123 does not fly out of its correct position when the sample supporting member 122 is moved.

In the manner described above, the sample 123 is two-dimensionally scanned with the light spot P. As a result, the serial signal S representing the two-dimensional enlarged image of the sample 123 is generated by the photodetector 130.

Part of the laser beam 111 is reflected as the reference laser beam 111R by the semi-transparent mirror 174. The reference laser beam 111R impinges upon a mirror 175 and is reflected thereby. The reference laser beam 111R, which has thus been reflected, passes through a second AOM 176. Thereafter, the beam diameter of the reference laser beam 111R is increased by the a beam expander 177. The reference laser beam 111R then impinges upon the semi-transparent mirror 128 and is combined with the laser beam 111' in the manner described above.

The first AOM is operated by a drive circuit 180 and modulates the laser beam 111, which has passed through the semi-transparent mirror 174. Also, the second AOM 176 is operated by a drive circuit 181 and modulates the reference laser beam 111R. The modulation of the laser beam 111 is determined by Formula (1). The modulation of the reference laser beam 111R is determined by Formula (2). In this embodiment, the modulation frequency f1 for the laser beam 111 is set as f1=80 MHz, and the modulation frequency f2 for the reference laser beam 111R is set as f2=78 MHz.

In cases where the laser beam 111 and the reference laser beam 111R are modulated in this manner, the output signal S obtained from the photodetector 130 includes the beat components due to the two laser beams, i.e. the components modulated with the frequency $\Delta f = f1 - f2$, and the other components. The signal S thus obtained is passed through a low-pass filter 170, and a signal S' is obtained thereby. The signal S' is then sampled by an A/D converter 171 with a sampling frequency fs in accordance with a sampling clock signal CLK and is thereby converted into a digital image signal Sd, which has been divided into image signal components corresponding to picture elements. The digital image signal Sd is stored on an image memory 172. The digital image signal Sd is thereafter fed into a CRT display device 173 and used in reproducing an image.

The modulation frequency f1 and the modulation frequency f2 are set such that the value of $\Delta f$ may be higher than the cut-off frequency fc of the low-pass filter 170. Also, the sampling frequency fs is set such that it may be lower than the cut-off frequency. Specifically, the following relationship obtains:

$$fs < fc < \Delta f$$

In this example, $\Delta f = 2$ MHz, fc=1.5 MHz, and fs=1 MHz. When the signal S is passed through the low-pass filter 170, the output signal S' is obtained therefrom which is free of the beat components modulated with the frequency $\Delta f$. As described above, such a signal S' represents the dark field image of the sample 123. Therefore, the dark field image is reproduced by the CRT display device 173.

The output signal S of the photodetector 130 may not be passed through the low-pass filter 170 but may be fed directly into the A/D converter 170. In such cases, as in this embodiment, if the output signal S is sampled with a sampling frequency fs, which is equal to a common measure of $\Delta f$, the inphase information of the beam components is sampled. From the digital image signal Sd, which has thus been divided into image signal components corresponding to picture elements, a bright field image of the sample 123 can be reproduced on the CRT display device 173.

Figure 15:
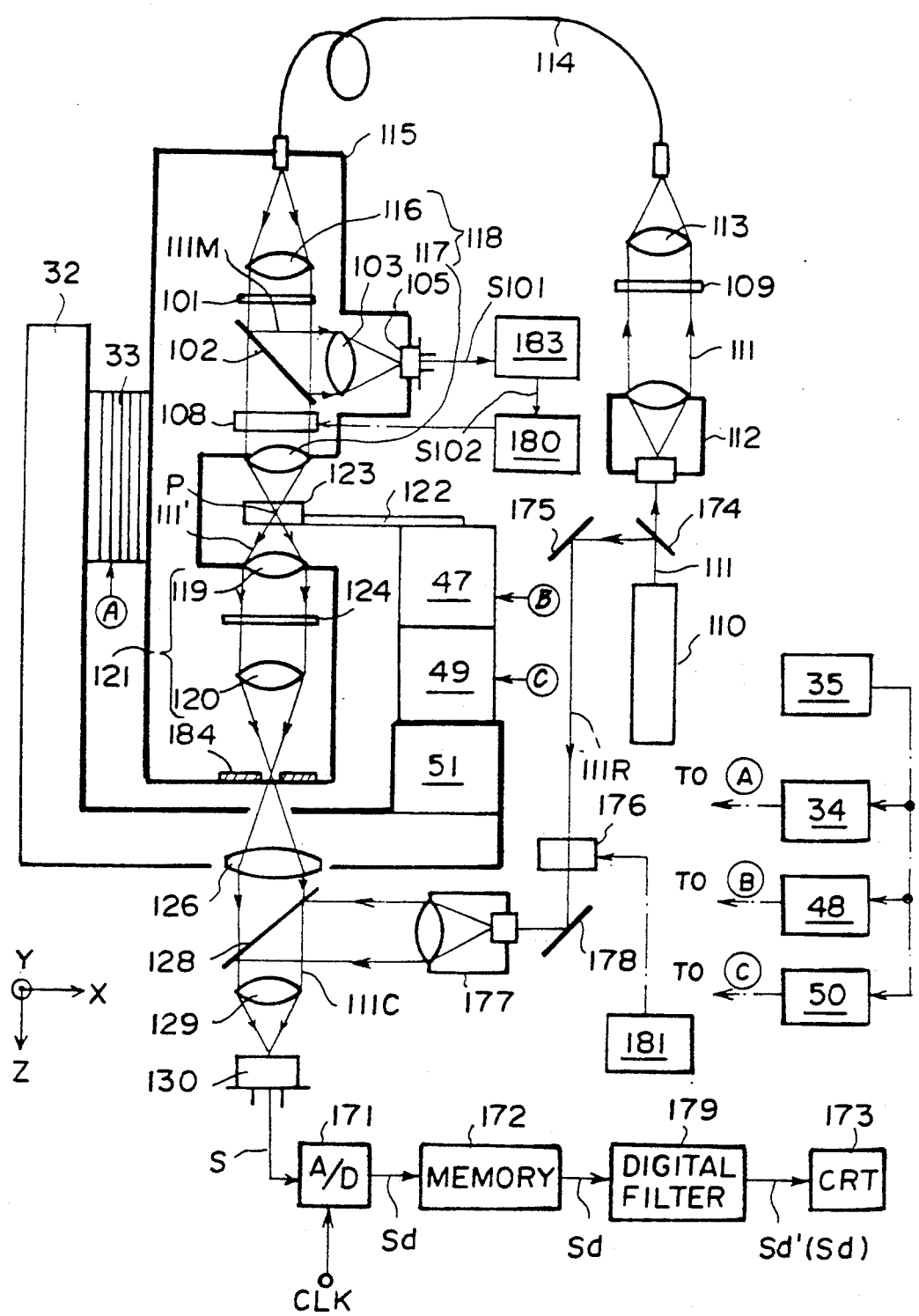
FIG. 15 is a schematic side view showing another embodiment of the confocal scanning microscope in accordance with the present invention.

Another embodiment of the confocal scanning microscope in accordance with the present invention will be described hereinbelow with reference to FIG. 15.

In this embodiment, the first AOM 108 is located in the light projecting optical means 118, which is supported on the movable member 115. Before the laser beam 111 impinges upon the first AOM 108, part of the laser beam 111 is reflected as a monitor laser beam 11M by a semi-transparent mirror 102. The monitor laser beam 111M is condensed by a condensing lens 103 and detected by a photodetector 105. By way of example, the photodetector 105 is constituted of a small and light photodetector, such as a photodiode, and is secured to the movable member 115.

The photodetector 105 generates a light amount signal S101. The light amount signal S101 is then fed into a light amount control circuit 183. The light amount control circuit 183 compares the signal S101 with a reference signal representing a predetermined light amount and generates a drive control signal S102 for controlling the first AOM 108 such that the deviation between the two signals may be eliminated. The drive control signal S102 is fed into an AOM drive circuit 180. As in the embodiment of FIG. 14, the AOM drive circuit 180 operates the first AOM 108 such that the laser.beam 111 may be modulated with the first modulation frequency f1. Additionally, the AOM drive circuit 180 controls the first AOM 108 in accordance with the signal S102. Specifically, in cases where the amount of light detected by the photodetector 105 is larger than the predetermined amount of light, the first AOM 108 is controlled such that the amount of the zero-order light component may be reduced. In cases where the amount of light detected by the photodetector 105 is smaller than the predetermined amount of light, the first AOM 108 is controlled such that the amount of the zero-order light component may be increased.

In the manner described above, it is possible to compensate for any fluctuation in the amount of light due to shifting of the optical axis, which is caused to occur by a bend of the optical fiber 114, vibrations of a fiber coupling part, a change in temperature, or the like. The amount of the laser beam 111 prior to the modulation can thus be kept constant. Therefore, by eliminating the adverse effects of fluctuation in the amount of light, an image can be obtained which has good image quality and uniform image density.

Also, in this embodiment, a pinhole plate 184 is secured to the movable member 115 at the position, at which the point image of the laser beam 111' having passed through the sample 123 is formed. The laser beam 111', which has passed through the opening of the pinhole plate 184 is combined with the reference laser beam 111R, and the combined laser beam is detected by the photodetector 130. In such cases, the movable member 115 moves with respect to the photodetector 130 in order to carry out the main scanning of the sample 123 with the light spot P. Therefore, a photodetector having a wide light receiving surface is employed as the photodetector 130. The photodetector 130 may be secured to the movable member 115 together with the light receiving optical means 121.

By detecting the laser beam 111' via the pinhole plate 184 in the manner described above, a halo of the laser beam 111' and other unnecessary light, such as the light scattered by the sample 123, can be blocked by the pinhole plate 184.

In this embodiment, the output signal S of the photodetector 130 is converted by the A/D converter 171 into a digital image signal Sd. The digital image signal Sd is stored on the image memory 172. The digital image signal Sd is then read from the image memory 172 and is passed through a digital filter 179. A signal Sd' is obtained from the digital filter 179 and is then fed into the CRT display device 173. An image is reproduced by the CRT display device 173 from the digital image signal Sd'.

The digital filter 179 carries out the filtering process on the digital image signal Sd in order to eliminate the first term of Formula (5). In this manner, in this embodiment, a dark field image of the sample 123 can be reproduced on the CRT display device 173 from the digital image signal Sd', which has been obtained from the filtering process. Also, by feeding the digital image signal Sd directly into the CRT display device 173 without the filtering process being carried out, a bright field image of the sample 123 can be obtained.

The embodiments of the confocal scanning microscope in accordance with the present invention are constituted as monochromatic confocal scanning microscopes which are of the transmission type. However, the confocal scanning microscope in accordance with the present invention is also applicable when color images are formed.

What is claimed is:

1. A scanning microscope comprising:
   (i) a sample supporting member on which a sample is supported,
   (ii) a light source for producing a light beam including a light component, which has been polarized linearly in a first direction, and a light component, which has been polarized linearly in a second direction that intersects perpendicularly to said first direction,
   (iii) a first polarizer which has a predetermined shape, said first polarizer transmitting only said light component, which has been polarized linearly in said first direction, therethrough,
   (iv) a second polarizer for transmitting only said light component, which has been polarized linearly in said second direction, therethrough,
   (v) a light projecting optical means for forming an image of the light beam composed of said light components, which have respectively passed through said first polarizer and said second polarizer, said image being formed as a small light spot on said sample,
   (vi) a scanning means which causes said light spot to scan said sample two-dimensionally,
   (vii) a beam trap having a light blocking part which has a shape corresponding to the shape of said first polarizer, said beam trap blocking only the direct light component, which has been polarized linearly in said first direction, said direct light component having passed through said sample,
   (viii) a polarization beam splitter for separating said light component, which has been polarized linearly in said first direction, and said light component, which has been polarized linearly in said second direction, from each other, two said light components being included in part of said light beam, which part has passed through said sample and then through said beam trap,
   (ix) a first light receiving optical means for condensing said light component, which has been polarized linearly in said first direction, said light component having been separated by said polarization beam splitter from said light component, which has been polarized linearly in said second direction, an image of the condensed light component being thereby formed as a point image,
   (x) a second light receiving optical means for condensing said light component, which has been polarized linearly in said second direction, said light component having been separated by said polarization beam splitter from said light component, which has been polarized linearly in said first direction, an image of the condensed light component being thereby formed as a point image,
   (xi) a first photodetector for detecting said point image, which has been formed by said first light receiving optical means, and
   (xii) a second photodetector for detecting said point image, which has been formed by said second light receiving optical means.

2. A scanning microscope as defined in claim 1 wherein said first polarizer has a ring-like shape,
said second polarizer is composed of two parts, one of which is located on the side inward from said ring-like first polarizer with respect to the radial direction of said ring-like first polarizer and the other of which is located on the side outward from said ring-like first polarizer with respect to the radial direction of said ring-like first polarizer, and
said light blocking part of said beam trap has a ring-like shape corresponding to the shape of said first polarizer.

3. A scanning microscope as defined in claim 1 or 2 wherein a first color filter is located such that it may overlap said first polarizer and said second polarizer, said first color filter being provided with a plurality of parts, each of which selectively transmits one of three-color light components,
a second color filter is located such that it may overlap said beam trap, said second color filter being provided with a plurality of parts, each of which selectively transmits one of three color light components,
a color separation means is provided which separates the light beam having passed through said beam trap and said second color filter into three color light components, and
three said first photodetectors and three said second photodetectors are provided which respectively detect the three color light components having been separated from one another.

4. A scanning microscope as defined in claim 1 wherein said scanning means is constituted of a movable member, on which said light projecting optical means is supported, and a drive means for reciprocally moving said movable member with respect to said sample supporting member.

5. A scanning microscope as defined in claim 4 wherein said drive means is constituted of a laminated piezo-electric device and a drive circuit for operating said laminated piezo-electric device.

6. A scanning microscope as defined in claim 4 or 5 wherein said light source is located on the side outward from said movable member and is optically connected to said light projecting optical means by an optical fiber.

7. A scanning microscope as defined in claim 1 wherein said light source is a laser.

8. A scanning microscope comprising:
   (i) a sample supporting member on which a sample is supported,
   (ii) a light source for producing a light beam including a light component, which has been polarized linearly in a first direction, and a light component, which has been polarized linearly in a second direction that intersects perpendicularly to said first direction, (iii) a stop member provided with an opening which has a predetermined shape, said stop member stopping said light beam, (iv) a light projecting optical means for forming an image of part of said light beam, which part has passed through said stop member, said image being formed as a small light spot on said sample, (v) a scanning means which causes said light spot to scan said sample two-dimensionally, (vi) a first analyzer for transmitting only said light component, which has been polarized linearly in said first direction, therethrough, said light component having passed through said sample, (vi) a second analyzer which has a shape corresponding to the shape of said opening of said stop member, said second analyzer transmitting only the direct light component, which has been polarized linearly in said second direction, therethrough, said light component having passed through said sample, (viii) a polarization beam splitter for separating said light component, which has been polarized linearly in said first direction, said light component having passed through said first analyzer, and said light component, which has been polarized linearly in said second direction, said light component having passed through said second analyzer, from each other, (ix) a first light receiving optical means for condensing said light component, which has been polarized linearly in said first direction, said light component having been separated by said polarization beam splitter from said light component, which has been polarized linearly in said second direction, an image of the condensed light component being thereby formed as a point image, (x) a second light receiving optical means for condensing said light component, which has been polarized linearly in said second direction, said light component having been separated by said polarization beam splitter from said light component, which has been polarized linearly in said first direction, an image of the condensed light component being thereby formed as a point image, (xi) a first photodetector for detecting said point image, which has been formed by said first light receiving optical means, and (xii) a second photodetector for detecting said point image, which has been formed by said second light receiving optical means.

9. A scanning microscope as defined in claim 8 wherein said stop member is constituted of a ring stop having a ring-like opening, said second analyzer has a ringlike shape corresponding to the shape of said opening of said ring stop, and said first analyzer is composed of two parts, one of which is located on the side inward from said ring-like second analyzer with respect to the radial direction of said ring-like second analyzer and the other of which is located on the side outward from said ring-like second analyzer with respect to the radial direction of said ring-like second analyzer.

10. A scanning microscope as defined in claim 8 wherein said scanning means is constituted of a movable member, on which said light projecting optical means is supported, and a drive means for reciprocally moving said movable member with respect to said sample supporting member.

11. A scanning microscope as defined in claim 10 wherein said drive means is constituted of a laminated piezo-electric device and a drive circuit for operating said laminated piezo-electric device.

12. A scanning microscope as defined in claim 10 or 11 wherein said light source is located on the side outward from said movable member and is optically connected to said light projecting optical means by an optical fiber.

13. A scanning microscope as defined in claim 8 wherein said light source is a laser.

14. A scanning microscope comprising:

(i) a sample supporting member on which a sample is supported, (ii) a light source for producing a light beam including a light component, which has a first wavelength, and a light component, which has a second wavelength different from said first wavelength, (iii) a first filter which has a predetermined shape, said first filter transmitting only said light component, which has said first wavelength, therethrough, (iv) a second filter for transmitting only said light component, which has said second wavelength, therethrough, (v) a light projecting optical means for forming an image of the light beam composed of said light components, which have respectively passed through said first filter and said second filter, said image being formed as a small light spot on said sample, (vi) a scanning means which causes said light spot to scan said sample two-dimensionally, (vii) a beam trap having a light blocking part which has a shape corresponding to the shape of said first filter, said beam trap blocking only the direct light component, which has said first wavelength, said direct light component having passed through said sample, (viii) a light splitting means for separating said light component, which has said first wavelength, and said light component, which has said second wavelength, from each other, two said light components being included in part of said light beam, which part has passed through said sample and then through said beam trap, (ix) a first light receiving optical means for condensing said light component, which has said first wavelength, said light component having been separated by said light splitting means from said light component, which has said second wavelength, an image of the condensed light component being thereby formed as a point image, (x) a second light receiving optical means for condensing said light component, which has said second wavelength, said light component having been separated by said light splitting means from said light component, which has said first wavelength, an image of the condensed light component being thereby formed as a point image, (xi) a first photodetector for detecting said point image, which has been formed by said first light receiving optical means, and (xii) a second photodetector for detecting said point image, which has been formed by said second light receiving optical means.

15. A scanning microscope as defined in claim 14 wherein said first filter has a ring-like shape, said second filter is composed of two parts, one of which is located on the side inward from said ring-like first filter with respect to the radial direction of said ring-like first filter and the other of which is located on the side outward from said ring-like first filter with respect to the radial direction of said ring-like first filter, and said light blocking part of said beam trap has a ring-like shape corresponding to the shape of said first filter.

16. A scanning microscope as defined in claim 14 wherein said scanning means is constituted of a movable member, on which said light projecting optical means is supported, and a drive means for reciprocally moving said movable member with respect to said sample supporting member.

17. A scanning microscope as defined in claim 16 wherein said drive means is constituted of a laminated piezo-electric device and a drive circuit for operating said laminated piezo-electric device.

18. A scanning microscope as defined in claim 16 or 17 wherein said light source is located on the side outward from said movable member and is optically connected to said light projecting optical means by an optical fiber.

19. A scanning microscope as defined in claim 14 wherein said light source is a laser.

20. A scanning microscope comprising:
(i) a sample supporting member on which a sample is supported,
(ii) a light source for producing a light beam including a light component, which has a first wavelength, and a light component, which has a second wavelength different from said first wavelength,
(iii) a stop member provided with an opening which has a predetermined shape, said stop member stopping said light beam,
(iv) a light projecting optical means for forming an image of part of said light beam, which part has passed through said stop member, said image being formed as a small light spot on said sample,
(v) a scanning means which causes said light spot to scan said sample two-dimensionally, component, which has said first wavelength, therethrough, said light component having passed through said sample,
(vii) a second filter which has a shape corresponding to the shape of said opening of said stop member, said second filter transmitting only the direct light component, which has said second wavelength, therethrough, said direct light component having passed through said sample,
(viii) a light splitting means for separating said light component, which has said first wavelength, said light component having passed first filter, and said light component, which has said second wavelength, said light component having passed through said second filter, from each other,
(ix) a first light receiving optical means for condensing said light component, which has said first wavelength, said light component having been separated by said light splitting means from said light component, which has said second wavelength, an image of the condensed light component being thereby formed as a point image,
(x) a second light receiving optical means for condensing said light component, which has said second wavelength, said light component having been separated by said light splitting means from said light component, which has said first wavelength, an image of the condensed light component being thereby formed as a point image,
(xi) a first photodetector for detecting said point image, which has been formed by said first light receiving optical means, and
(xii) a second photodetector for detecting said point image, which has been formed by said second light receiving optical means.

21. A scanning microscope as defined in claim 20 wherein said stop member is constituted of a ring stop having a ring-like opening, said second filter has a ring-like shape corresponding to the shape of said opening of said ring stop, and said first filter is composed of two parts, one of which is located on the side inward from said ring-like second filter with respect to the radial direction of said ring-like second filter and the other of which is located on the side outward from said ring-like second filter with respect to the radial direction of said ring-like second filter.

22. A scanning microscope as defined in claim 20 wherein said scanning means is constituted of a movable member, on which said light projecting optical means is supported, and a drive means for reciprocally moving said movable member with respect to said sample supporting member.

23. A scanning microscope as defined in claim 22 wherein said drive means is constituted of a laminated piezo-electric device and a drive circuit for operating said laminated piezo-electric device.

24. A scanning microscope as defined in claim 22 or 23 wherein said light source is located on the side outward from said movable member and is optically connected to said light projecting optical means by an optical fiber.

25. A scanning microscope as defined in claim 20 wherein said light source is a laser.

26. A confocal scanning microscope comprising:
(i) a sample supporting member on which a sample is supported,
(ii) a light source which produces a light beam,
(iii) a light projecting optical means with which an image of said light beam is formed as a small light spot on said sample,
(iv) a light receiving optical means with which the light beam having passed through said sample is condensed, and an image of the condensed light beam is formed as a point image,
(v) a scanning means which causes said light spot to scan said sample two-dimensionally,
(vi) a beam splitting means for splitting said light beam, which has been produced by said light source, into a light beam, which is to be irradiated to said sample, and a reference light beam, which is not to be irradiated to said sample, before said light beam having been produced by said light source impinges upon said sample,
(vii) a beam combining means for combining said light beam, which has passed through said sample, and said reference light beam with each other, (viii) a first modulation means for modulating said light beam, which has been radiated out of said beam splitting means and which is to be irradiated to said sample, with a first modulation frequency, (ix) a second modulation means for modulating said reference light beam with a second modulation frequency, which is different from said first modulation frequency, (x) a photodetector for detecting the combined light beam, which has been radiated out of said beam combining means, and (xi) a filter means for obtaining a signal by eliminating beat components, which result from the modulated light beam and the modulated reference light beam, from an output signal generated by said photodetector.

27. A confocal scanning microscope as defined in claim 26 wherein said scanning means is constituted of a movable member, on which said light projecting optical means is supported, and a drive means for reciprocally moving said movable member with respect to said sample supporting member.

28. A confocal scanning microscope as defined in claim 27 wherein said drive means is constituted of a laminated piezo-electric device and a drive circuit for operating said laminated piezo-electric device.

29. A confocal scanning microscope as defined in claim 27 or 28 wherein said light source is located on the side outward from said movable member and is optically connected to said light projecting optical means by an optical fiber.

30. A confocal scanning microscope as defined in claim 26 wherein said light source is a laser.

* * * * *